(12) United States Patent
Yin et al.

(10) Patent No.: US 12,304,921 B2
(45) Date of Patent: May 20, 2025

(54) LINEAR BORON-DIPYRROMETHENE ELECTRON DONOR HAVING 180° COORDINATION INCLUDED ANGLE AND SUPRAMOLECULAR METAL MACRO-RING, AND SYNTHESIS PROCESSES THEREFOR AND APPLICATIONS THEREOF

(71) Applicant: Hangzhou Normal University, Hangzhou (CN)

(72) Inventors: Shouchun Yin, Hangzhou (CN); Yang Li, Hangzhou (CN); Xiongjie Lin, Hangzhou (CN); Tian He, Hangzhou (CN)

(73) Assignee: Hangzhou Normal University, Hangzhou (CN)

( * ) Notice: Subject to any disclaimer, the term of this patent is extended or adjusted under 35 U.S.C. 154(b) by 0 days.

(21) Appl. No.: 18/814,583

(22) Filed: Aug. 25, 2024

(65) Prior Publication Data

US 2025/0066403 A1 Feb. 27, 2025

Related U.S. Application Data

(63) Continuation of application No. PCT/CN2022/100792, filed on Jun. 23, 2022.

(30) Foreign Application Priority Data

Feb. 28, 2022 (CN) .................. 202210185519.6

(51) Int. Cl.
| | | |
|---|---|---|
| C07F 5/02 | (2006.01) | |
| C07F 15/00 | (2006.01) | |
| C09K 11/06 | (2006.01) | |
| G01N 21/64 | (2006.01) | |

(52) U.S. Cl.
CPC .......... *C07F 15/0086* (2013.01); *C07F 5/022* (2013.01); *C09K 11/06* (2013.01); *C09K 2211/1007* (2013.01); *C09K 2211/1011* (2013.01); *C09K 2211/1014* (2013.01); *C09K 2211/1022* (2013.01); *C09K 2211/1029* (2013.01); *C09K 2211/1055* (2013.01); *C09K 2211/185* (2013.01); *G01N 21/6486* (2013.01)

(58) Field of Classification Search
CPC ............ C07F 5/022; C09K 2211/1055; C09K 2211/1014; C09K 2211/1022
See application file for complete search history.

(56) References Cited

U.S. PATENT DOCUMENTS

2021/0108133 A1* 4/2021 Sung ................ G02F 1/133617

FOREIGN PATENT DOCUMENTS

| CN | 113845551 A | 12/2021 |
|---|---|---|
| KR | 20190004552 A | 1/2019 |

OTHER PUBLICATIONS

Tingting Sun et al., "Mitochondria-Localized Fluorescent BODIPY-Platinum Conjugate", ACS Med. Chem. Lett., vol. 6, Feb. 11, 2015, pp. 430-4333.
Gajendra Gupta et al., "Heterometallic BODIPY-Based Molecular Squares Obtained by Self-Assembly: Synthesis and Biological Activities", ACS Omega, vol. 4, Aug. 1, 2019, pp. 13200-13208.
Jun Xu et al., "Constructing a triangular metallacycle with salen-Al and its application to a catalytic cyanosilylation reaction", Chem. Commun., vol. 57, Sep. 11, 2021, pp. 10399-10402.
Jiong Zhou et al., "Highly Emissive Self-Assembled BODIPY-Platinum Supramolecular Triangles", J.Am.Chem.Soc., vol. 140, May 22, 2018, pp. 7730-7736.
Xiongjie Lin et al., "Phenylthiol-BODIPY-based supramolecular metallacycles for synergistic tumor chemo-photodynamic therapy", PNAS, vol. 119, Issue 29, Sep. 11, 2022, e2203994119.
Internation Search Report of PCT/CN2022/100792 Mailed Nov. 29, 2022.
Jun Xu et al Chem. Commun., 2021, 57, 10399 Constructing a triangular metallacycle with salen—Al and its application to a catalytic cyanosilylation reaction.
Gajendra Gupta et al DOI: 10.1021/acsomega.9b01328 ACS Omega Heterometallic BODIPY-Based Molecular Squares Obtained by Self-Assembly: Synthesis and Biological Activities.
Jiong Zhou et al. J. Am. Chem. Soc., Just Accepted Manuscript . DOI: 10.1021/jacs.8b04929 • Publication Date (Web): May 22, 2018 Highly Emissive Self-Assembled BODIPY-Platinum Supramolecular Triangles.
Tingting Sun et al. ACS Med. Chem. Lett., Just Accepted Manuscript • DOI: 10.1021/acsmedchemlett.5b00041 • Publication Date (Web): Feb. 11, 2015 A Mitochondria-Localized Fluorescent BODIPY-Platinum Conjugate.
Xiongjie Lin et al PNAS https://doi.org/10.1073/pnas.2203994119 Phenylthiol-BODIPY-based supramolecular metallacycles for synergistic tumor chemo-photodynamic therapy.
OA of CN 202210185519.6, Mailed Jun. 22, 2023.
Notice to Allowance of CN 202210185519.6, Mailed Jul. 24, 2023.

* cited by examiner

*Primary Examiner* — Alexander R Pagano
*Assistant Examiner* — Frank S. Hou

(57) ABSTRACT

Disclosed are a linear boron-dipyrromethene electron donor having a 180° coordination included angle and a supramolecular metallacycle, and synthesis processes therefor and applications thereof. The invention provides a linear boron-dipyrromethene electron donor as shown in formula 3 or formula 4, and a boron-dipyrromethene ligand-based supramolecular coordination compound having a 180° coordination included angle which is prepared by the metal coordination of the linear boron-dipyrromethene electron donor. Compared with a prepolymer, the boron-dipyrromethene ligand-based supramolecular coordination compound has better cell passive uptake capacity, cell fluorescence imaging capacity and photosensitive (singlet oxygen generation) capability.

5 Claims, 23 Drawing Sheets

LINEAR BORON-DIPYRROMETHENE ELECTRON DONOR HAVING 180° COORDINATION INCLUDED ANGLE AND SUPRAMOLECULAR METAL MACRO-RING, AND SYNTHESIS PROCESSES THEREFOR AND APPLICATIONS THEREOF

TECHNICAL FIELD

The present invention belongs to the technical field of high molecular materials, and relates to a linear boron-dipyrromethene electron donor having a 180° coordination included angle and a supramolecular metallacycle, and synthesis processes therefor and applications thereof.

BACKGROUND OF THE PRESENT INVENTION

Supramolecular coordination compounds (SCCs) are a kind of discrete compounds with fixed shape and size, which are spontaneously formed by self-assembly of organic electron donors and metal electron acceptors driven by coordination. Because organic platinum compounds have an excellent anti-tumor ability, the SCCs based on organic platinum coordination are also available in potential anti-tumor applications. Boron-dipyrromethene (BODIPY) derivatives are a kind of excellent fluorescent molecules, and have a high singlet oxygen generation capacity at the same time, thus being widely used as photosensitizers in photodynamic therapy to achieve an anti-tumor effect. The introduction of the boron-dipyrromethene derivatives into a supramolecular metallacycle through metal coordination bonds can effectively improve the application ability and field of the latter.

SUMMARY OF THE PRESENT INVENTION

The first object of the present invention is to provide a linear boron-dipyrromethene electron donor having a 180° coordination included angle aiming at the defects in the prior art.

According to the linear boron-dipyrromethene electron donor having the 180° coordination included angle of the present invention, a chemical structural formula thereof is formula 3 or formula 4:

3

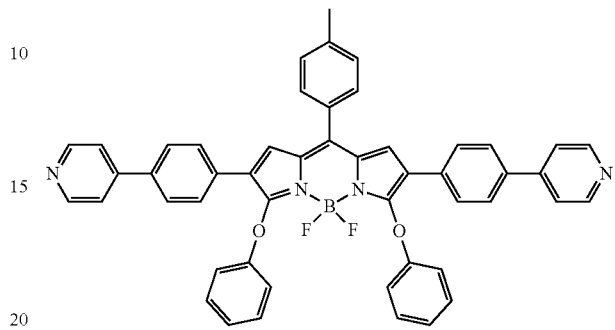

4

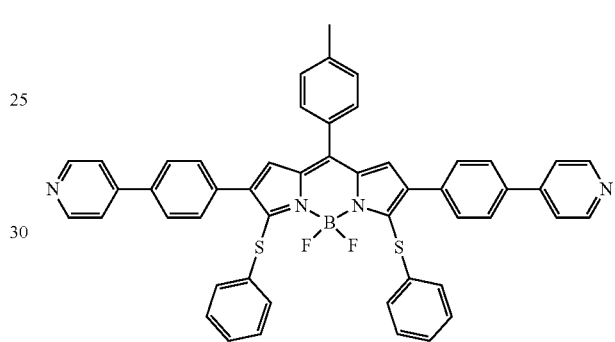

The second object of the present invention is to provide a synthetic method of a linear boron-dipyrromethene ligand having a 180° coordination included angle, wherein a synthetic route thereof is as follows.

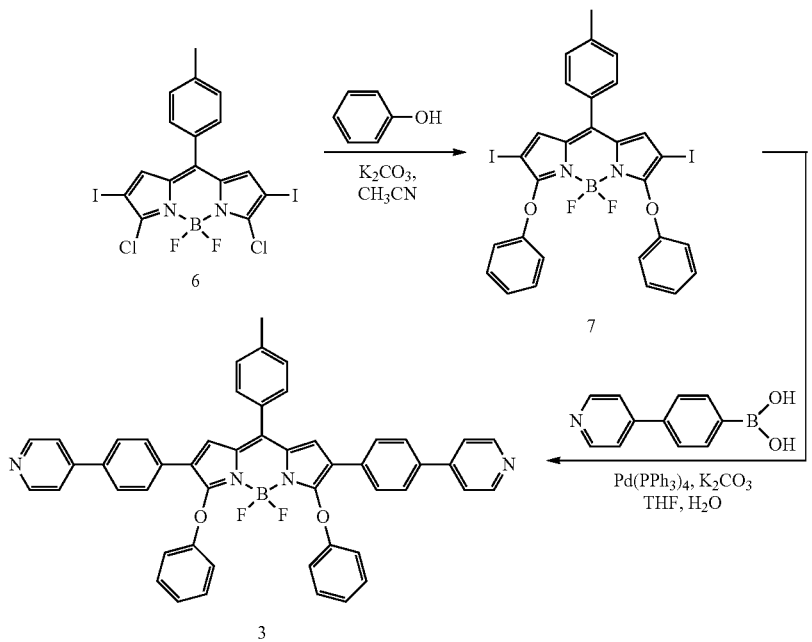

-continued

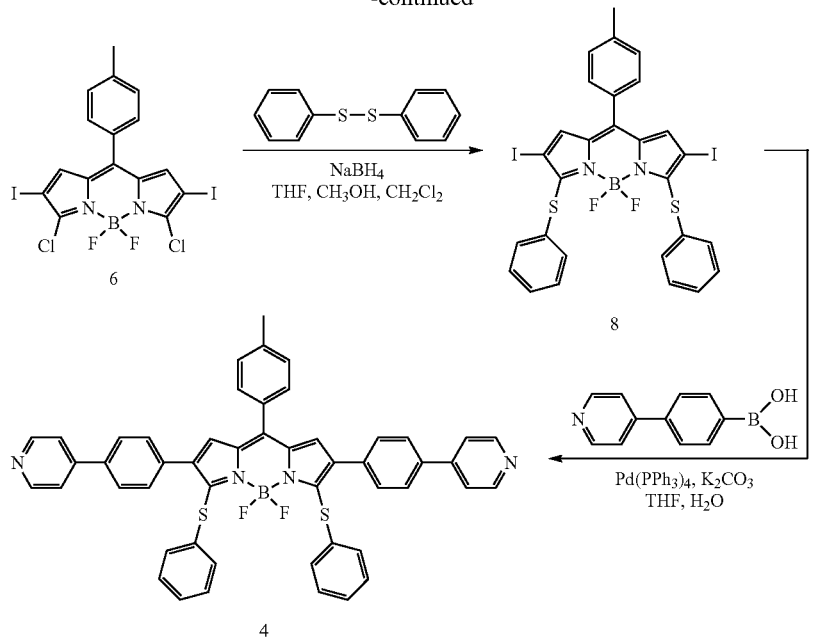

When a chemical structural formula of the linear boron-dipyrromethene ligand having the 180° coordination included angle is formula 3, a synthetic method thereof is as follows:
(1) a compound 6, phenol and potassium carbonate are added into acetonitrile, stirred and refluxed at 50° C. to 85° C. to react for 1 hour to 3 hours, and post-processed to obtain a compound 7;
wherein, a molar ratio of the compound 6 to the phenol and the potassium carbonate is 1:2.5 to 3:3; and
(2) the compound 7, 4-(4-pyridyl)phenylboronic acid, potassium carbonate and tetrakis(triphenylphosphine) palladium are added into a mixed solvent of tetrahydrofuran and water to react at 65° C. to 85° C. under the protection of nitrogen for 6 hours to 12 hours, and post-processed to obtain a compound 3;
wherein, preferably, a molar ratio of the compound 7 to the 4-(4-pyridyl)phenylboronic acid, the potassium carbonate and the tetrakis(triphenylphosphine)palladium is 1:2.5 to 4.5:6 to 12:0.05 to 0.1.

Preferably, in the step (1), a method of post-processing comprises: after reaction and cooling, extracting the product with water and ethyl acetate for many times, taking an organic phase, and drying with anhydrous magnesium sulfate. A pure compound 7 is obtained by separation through a silica gel chromatography column (an eluent is petroleum ether/dichloromethane in a volume ratio of 2:1).

Preferably, in the step (2), a volume ratio of the mixed solvent of tetrahydrofuran and water is 4:1.

Preferably, in the step (2), a method of post-processing comprises: after reaction, extracting the product with dichloromethane for many times, collecting an organic layer, removing a solvent, purifying through a silica gel column (dichloromethane/methanol in a volume ratio of 20/1), and finally rinsing the product with cold n-hexane and then drying to obtain a pure compound 3.

When a chemical structural formula of the linear boron-dipyrromethene ligand having the 180° coordination included angle is formula 4, a synthetic method thereof is as follows:

(1) diphenyl disulfide and sodium borohydride are added into tetrahydrofuran and heated to 50° C. to 80° C., then added with a small amount of methanol, and refluxed for 0.5 hour to 1 hour; and then cooled, added with a dichloromethane solution of a compound 6, continuously stirred for 5 minutes to 10 minutes, and post-processed after reaction to obtain a compound 8;
wherein, preferably, a molar ratio of the compound 6 to the diphenyl disulfide and the sodium borohydride is 1:2 to 2.5; 4 to 5; and
(2) the compound 8, 4-(4-pyridyl)phenylboronic acid, potassium carbonate and tetrakis(triphenylphosphine) palladium are added into tetrahydrofuran and water to react at 65° C. to 85° C. under the protection of nitrogen for 6 hours to 12 hours, and post-processed to obtain a compound 4;
wherein, preferably, a molar ratio of the compound 8 to the 4-(4-pyridyl)phenylboronic acid, the potassium carbonate and the tetrakis(triphenylphosphine)palladium is 1:2.5 to 4.5:6 to 12:0.05 to 0.1.

Preferably, in the step (1), a method of post-processing comprises: after reaction and cooling, extracting the product with water, dichloromethane and ethyl acetate for many times, taking an organic phase, and drying with anhydrous magnesium sulfate. A pure compound 8 is obtained by separation through a silica gel chromatography column (an eluent is petroleum ether/dichloromethane in a volume ratio of 2:1).

Preferably, in the step (2), a volume ratio of the mixed solvent of tetrahydrofuran and water is 4:1.

Preferably, in the step (2), a method of post-processing comprises: after reaction, extracting the product with dichloromethane for many times, collecting an organic layer, removing a solvent, purifying through a silica gel column (dichloromethane/methanol in a volume ratio of 20/1), and finally rinsing the product with cold n-hexane and then drying to obtain a pure compound 4.

The third object of the present invention is to provide a supramolecular metallacycle based on BODIPY, wherein a chemical structural formula thereof is formula 1 or formula 2:

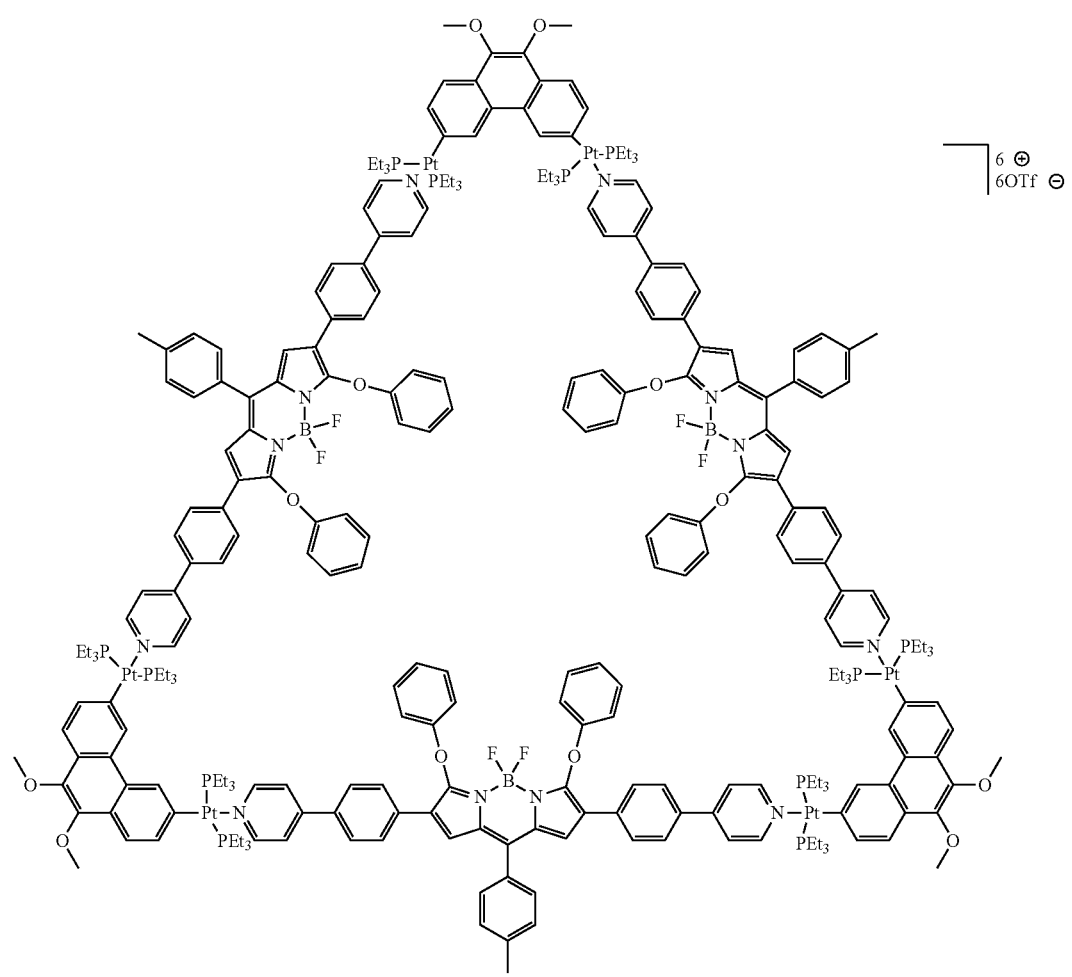

-continued
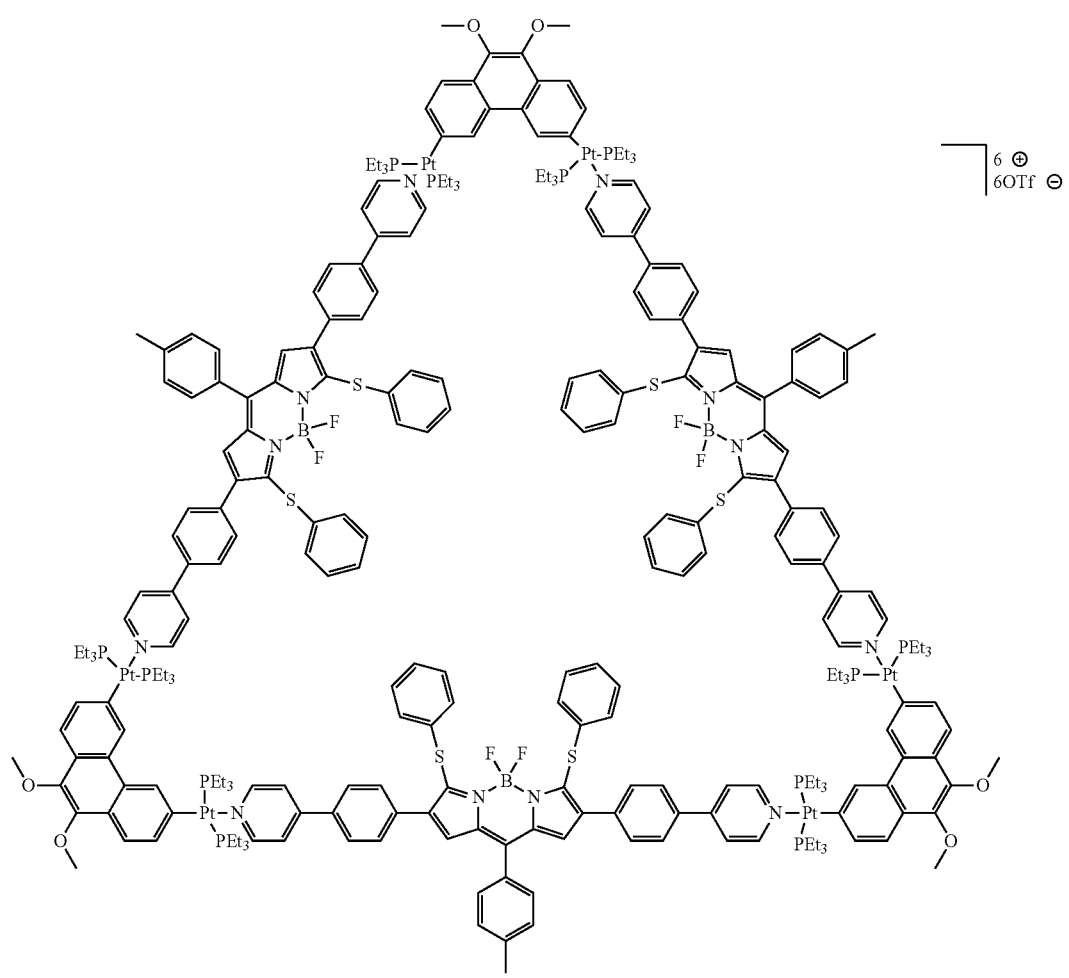
The fourth object of the present invention is to provide a synthetic method of a supramolecular metallacycle based on BODIPY, wherein a synthetic route thereof is as follows.

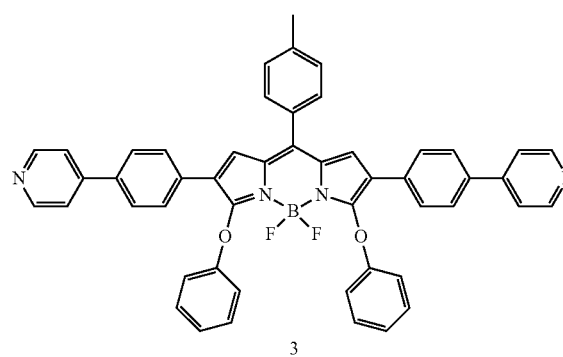
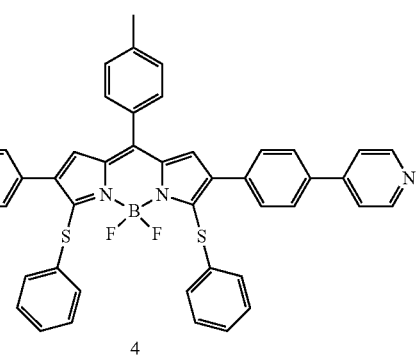
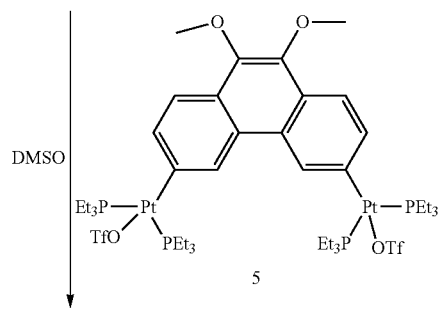
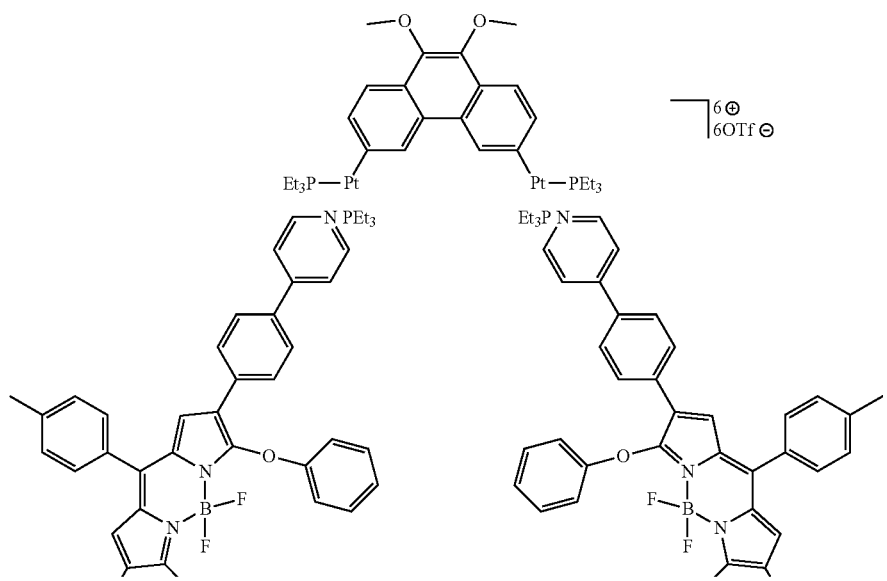

11            12
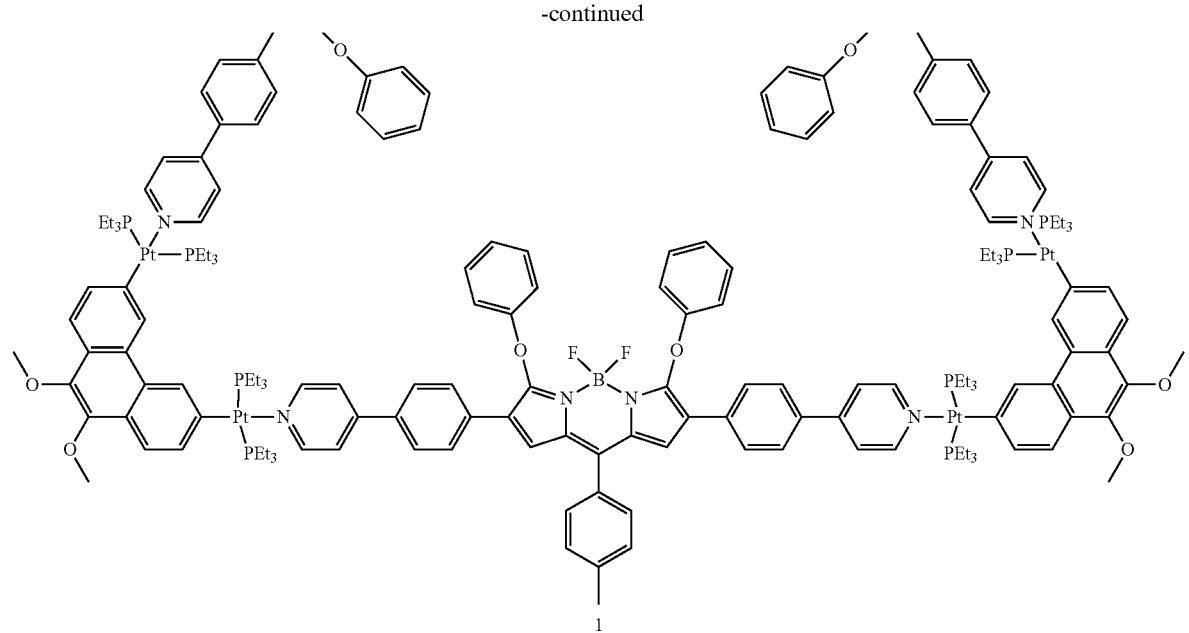
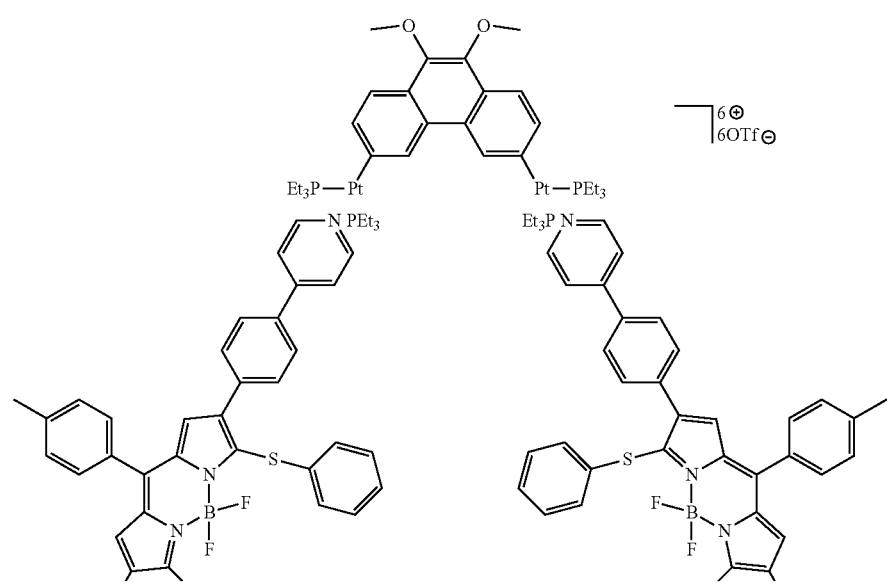

-continued

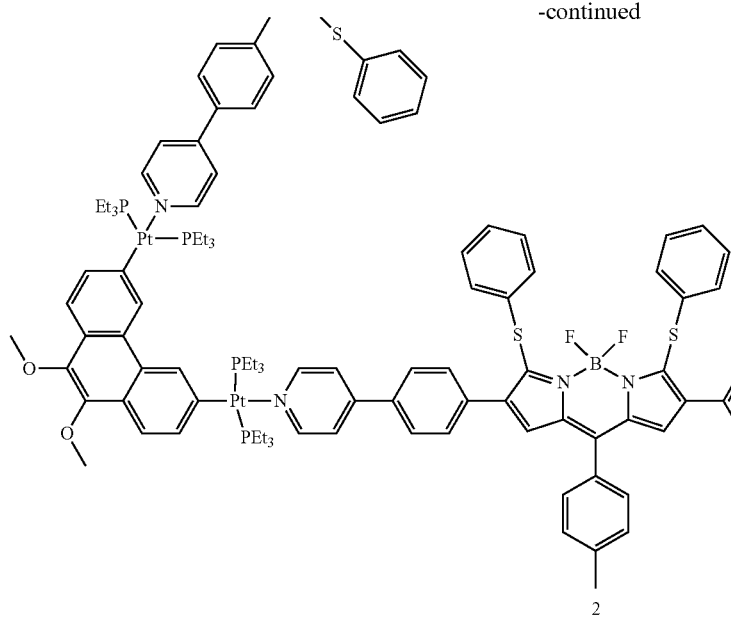
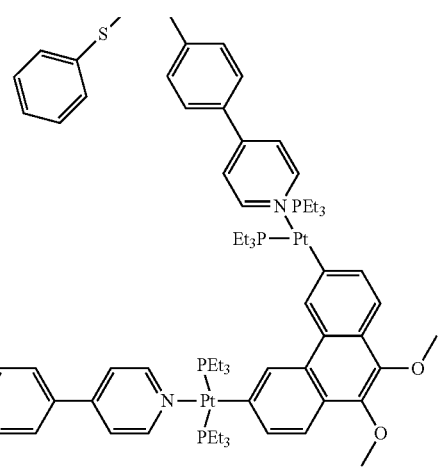

2

When a chemical structural formula of the supramolecular metallacycle based on BODIPY is formula 1, a synthetic method thereof is as follows:
the BODIPY ligand 3 and an organic platinum electron acceptor 5 of 60° are dissolved in dimethyl sulfoxide to react at 30° C. to 50° C. for 6 hours to 12 hours, and post-processed to obtain the supramolecular metallacycle 1,
wherein, preferably, a mass ratio of the BODIPY ligand 3 to the organic platinum electron acceptor 5 of 60° is 1:1.

Preferably, a method of post-processing comprises: filtering the obtained reaction mother solution with glass filter paper, adding ether into a filtrate to precipitate the product, centrifuging, pouring out a supernatant, and pumping a solid by an oil pump to obtain the supramolecular metallacycle 1.

When a chemical structural formula of the supramolecular metallacycle based on BODIPY is formula 2, a synthetic method thereof is as follows:
the BODIPY ligand 4 and an organic platinum electron acceptor 5 of 60° are dissolved in dimethyl sulfoxide to react at 30° C. to 50° C. for 6 hours to 12 hours, and post-processed to obtain the supramolecular metallacycle 2,
wherein, preferably, a mass ratio of the BODIPY ligand 4 to the organic platinum electron acceptor 5 of 60° is 1:1.

Preferably, a method of post-processing comprises: filtering the obtained reaction mother solution with glass filter paper, adding ether into a filtrate to precipitate the product, centrifuging, pouring out a supernatant, and pumping a solid by an oil pump to obtain the supramolecular metallacycle 2.

The fifth object of the present invention is to provide an application of a triangular supramolecular complex of a boron-dipyrromethene ligand having a 180° coordination included angle in a cell level, which is preferably cell fluorescence imaging.

The present invention has the beneficial effects as follows:
the supramolecular coordination compound of the boron-dipyrromethene ligand having the 180° coordination included angle prepared by metal coordination in the present invention, compared with a prepolymer, has better cell passive uptake capacity, cell fluorescence imaging capacity and photosensitive (singlet oxygen generation) capability.

DETAILED DESCRIPTION

Figure 1:
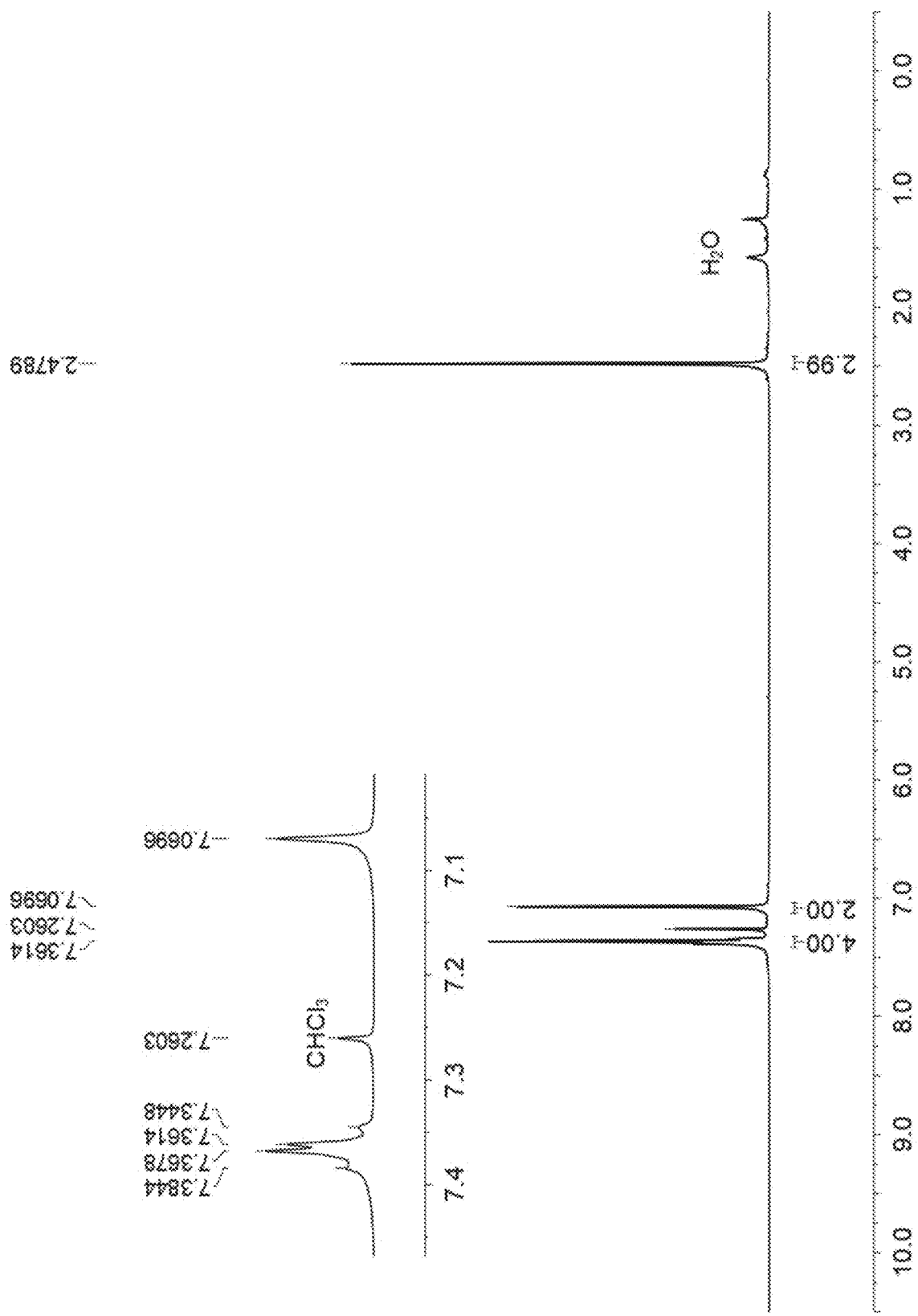
FIG. 1 is an $^1$H-NMR spectrum of a compound 6 synthesized in First Embodiment (with deuterated chloroform as a solvent)

The present invention is further described hereinafter with reference to specific embodiments, but the scope of protection of the present invention is not limited to this.

To make the objects, technical solutions, and advantages of the present invention clearer, the present invention is further described in detail hereinafter with reference to the drawings and embodiments. It should be understood that specific embodiments described herein are only used for explaining the present invention and are not intended to limit the present invention. In addition, the technical features involved in the implementations of the present invention described hereinafter may be combined with each other as long as they do not conflict with each other.

First Embodiment

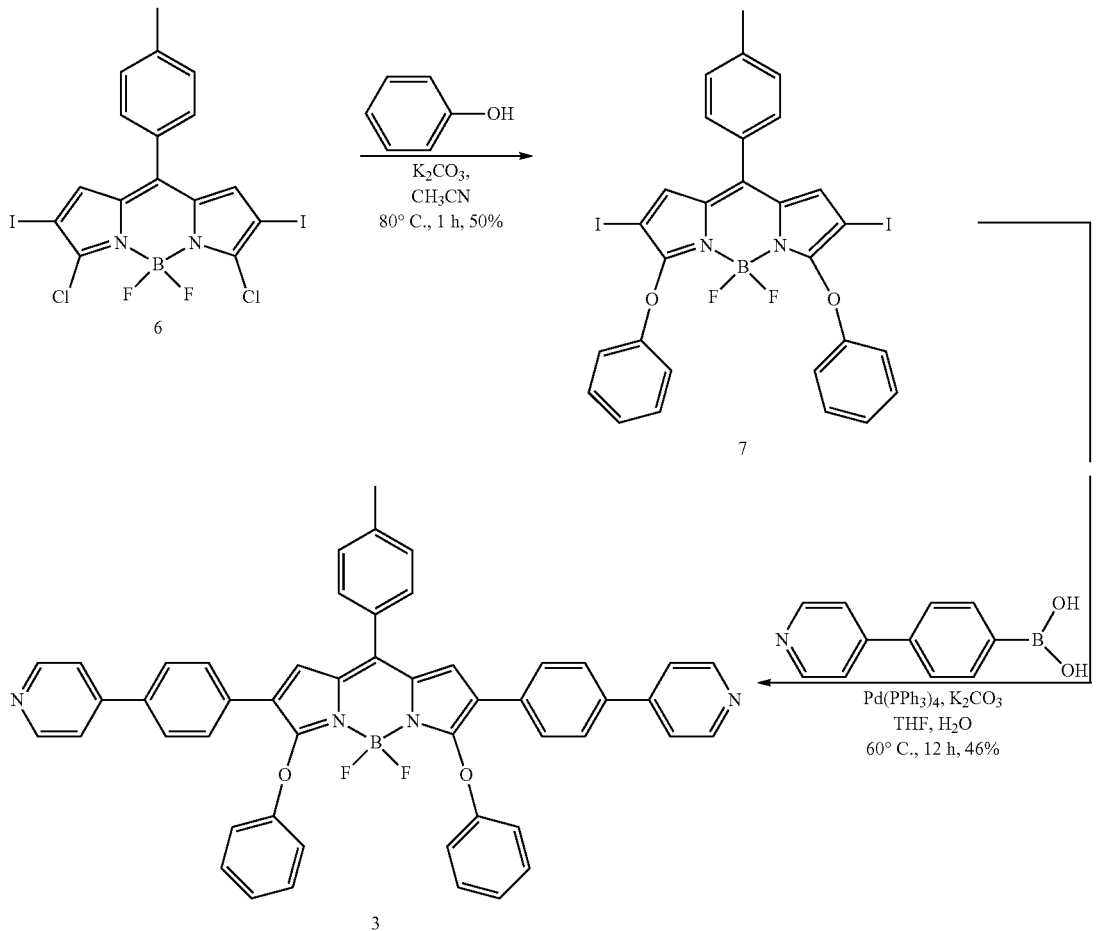

Preparation of Compound 7:

A compound 6 (500 mg, 0.8 mmol), phenol (164 mg, 2.1 mmol) and potassium carbonate (289 mg, 2.5 mmol) were added into a 250 mL round-bottom flask, and added with 150 mL of acetonitrile as a solvent. The above reaction product was put into an oil bath pan at 85° C., and stirred and refluxed to react for 1 hour. After reaction, the product was cooled to room temperature, then poured into 200 mL of water, and extracted with ethyl acetate (50 mL) for three times, and the product was dried with anhydrous magnesium sulfate to remove the solvent. The product was separated and purified through silica gel column chromatography (petroleum ether/dichloromethane in a volume ratio of 2:1). The product was rinsed with n-hexane, and dried to obtain a red powdery solid (299 mg, 50%).

$^1$H NMR (500 MHz, CDCl$_3$, 298 K): 7.44 (d, J=7.9 Hz, 2H), 7.33 (q, 6H), 7.13 (t, J=7.4 Hz, 2H), 7.08 (m, 6H), 2.48

65° C. under the protection of nitrogen for 12 hours, and cooled to room temperature. The product was extracted with dichloromethane (50 mL) for three times. The product was dried with anhydrous magnesium sulfate to remove the solvent, and the product was purified through a silica gel column (dichloromethane/methanol in a volume ratio of 20/1). Finally, the product was rinsed with cold n-hexane, and dried to obtain a purple powdery solid (250 mg, 46%).

$^1$H NMR (500 MHz, CDCl$_3$, 297 K): 8.61 (d, J=5.4 Hz, 4H), 7.58 (d, J=7.7 Hz, 2H), 7.46 (m, 14H), 7.13 (q, 6H), 7.02 (d, J=8.1 Hz, 4H), 6.95 (t, J=7.3 Hz, 2H), 2.53 (s, 3H). $^{13}$C NMR (126 MHz, CDCl$_3$, 297 K): 158.5, 156.5, 150.2, 147.5, 143.1, 141.2, 136.6, 132.1, 130.6, 130.0, 129.5, 129.5, 128.4, 127.8, 127.4, 126.9, 123.7, 121.9, 121.3, 116.6, 21.6. ESI-HR-MS: m/z 772.2929 [3+H]$^+$, calcd. for [C$_{50}$H$_{36}$BF$_2$N$_4$O$_2$]$^+$, 772.2930.

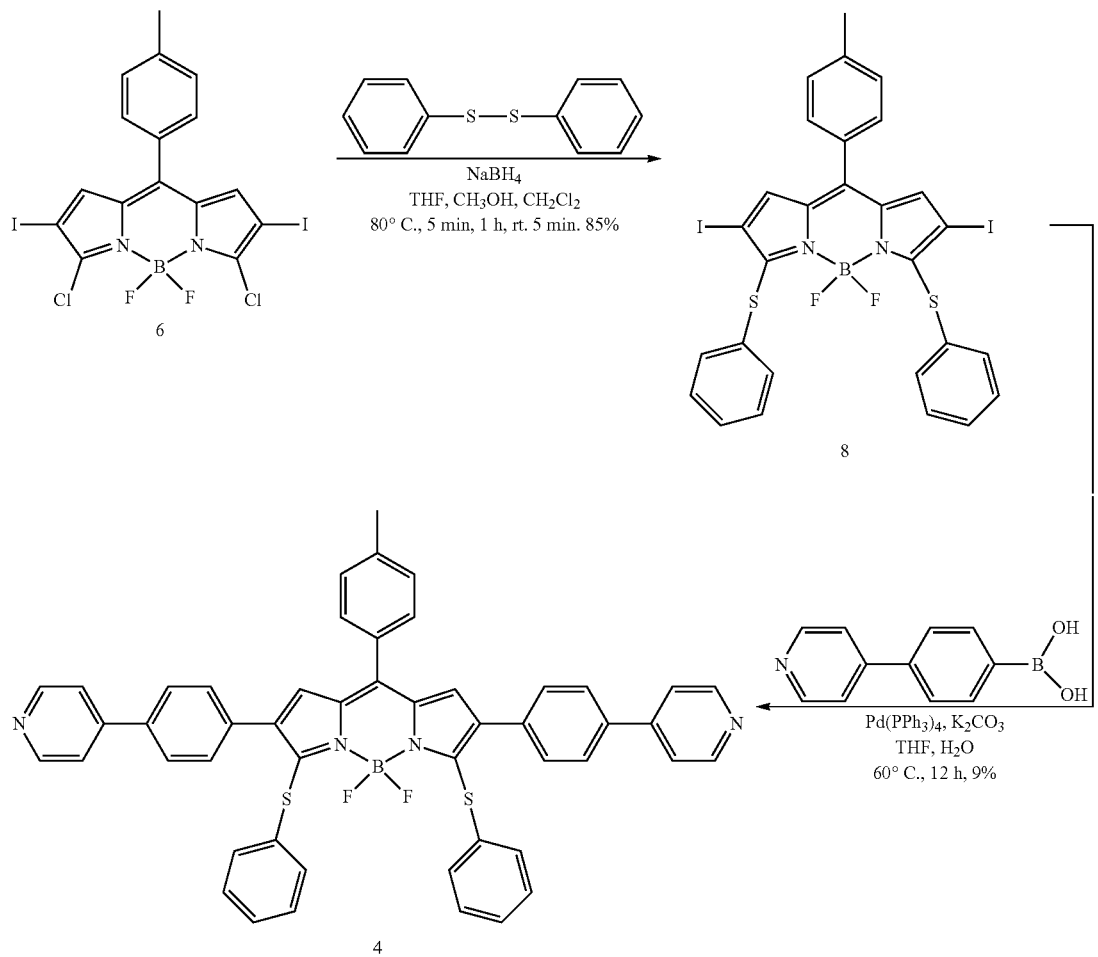

(s, 3H). $^{13}$C NMR (126 MHz, CDCl$_3$, 298 K): 160.2, 155.7, 141.6, 141.4, 138.1, 130.4, 129.8, 129.6, 129.4, 129.3, 124.3, 118.0, 61.9, 21.5. ESI-HR-MS: m/z 756.9491 [7+K]$^+$, calcd. for [C$_{28}$H$_{19}$BF$_2$I$_2$N$_2$O$_2$Na]$^+$, 756.9229.

Preparation of Compound 3:

A compound 7 (500 mg, 0.7 mmol), 4-(4-pyridyl)phenylboronic acid (346 mg, 1.7 mmol), potassium carbonate (577 mg, 4.2 mmol), tetrakis(triphenylphosphine)palladium (80 mg, 0.07 mmol), tetrahydrofuran (40 mL) and purified water (10 mL) were added into a 100 mL Shrek bottle to react at Preparation of Compound 8:

Diphenyl disulfide (362 mg, 1.7 mmol), sodium borohydride (126 mg, 3.3 mmol) and 30 mL of tetrahydrofuran were added into a 100 mL flask, and heated to 80° C. The mixture was added with 5 mL of methanol, refluxed for 1 hour, and cooled to room temperature, a dichloromethane solution (10 mL) of a compound 6 (500 mg, 0.8 mmol) was added into the above solution, and continuously stirred for 5 minutes, and the reaction was ended. The product was extracted with dichloromethane and ethyl acetate twice respectively, with 50 mL each time. Water was removed with anhydrous magnesium sulfate to remove the solvent. The product was purified through a silica gel column (petroleum ether/dichloromethane in a volume ratio of 2:1). Finally, the product was rinsed with cold n-hexane, and dried to obtain a blue powdery solid (530 mg, 85%).

$^1$H NMR (500 MHz, CDCl$_3$, 297 K): 7.43 (d, 6H), 7.35 (d, J=7.7 Hz, 2H), 7.30 (m, 6H), 7.12 (s, 2H), 2.47 (s, 3H). $^{13}$C NMR (126 MHz, CDCl$_3$, 297 K): 153.3, 141.9, 141.7, 138.6, 137.1, 133.5, 131.2, 130.6, 129.8, 129.5, 129.2, 127.6, 84.1, 21.5. ESI-HR-MS: m/z 750.6026 [8+H]$^+$, calcd. for [C$_{28}$H$_{20}$BF$_2$I$_2$N$_2$S$_2$]$^+$, 750.9213.

Preparation of Compound 4:

A compound 8 (1000 mg, 1.3 mmol), 4-(4-pyridyl)phenylboronic acid (633 mg, 3.3 mmol), potassium carbonate (1105 mg, 8.0 mmol) and tetrakis(triphenylphosphine)palladium (154 mg, 0.13 mmol) were added into a 250 mL Shrek bottle, and added with tetrahydrofuran (100 mL) and water (25 mL) as a solvent. After reaction at 65° C. under the protection of nitrogen for 12 hours, the product was cooled to room temperature, the mixed solution obtained from the reaction was poured into 100 mL of water, and the product was extracted with dichloromethane (50 mL) for three times. The solvent was removed, the product was purified through silica gel column chromatography (dichloromethane/methanol in a volume ratio of 20:1), and finally the product was rinsed with cold n-hexane, and dried to obtain a black powdery solid (100 mg, 9%).

$^1$H NMR (500 MHz, CDCl$_3$, 297 K): 8.64 (d, J=5.37 Hz, 4H), 7.53 (d, J=7.9 Hz, 2H), 7.43 (s, 12H), 7.36 (d, J=7.9 Hz, 2H), 7.21 (d, 4H), 7.02 (t, 8H), 2.50 (s, 3H). $^{13}$C NMR (126 MHz, CDCl$_3$, 297 K): 150.3, 150.0, 147.8, 142.0, 141.3, 136.9, 136.78, 136.8, 135.6, 134.0, 133.8, 130.6, 130.6, 129.4, 129.2, 129.0, 128.8, 127.1, 126.5, 121.4, 21.5. ESI-HR-MS: m/z 805.2430 [4+H]$^+$, calcd. for [C$_{50}$H$_{36}$BF$_2$N$_4$S$_2$]$^+$, 805.2437.

Figure 2:
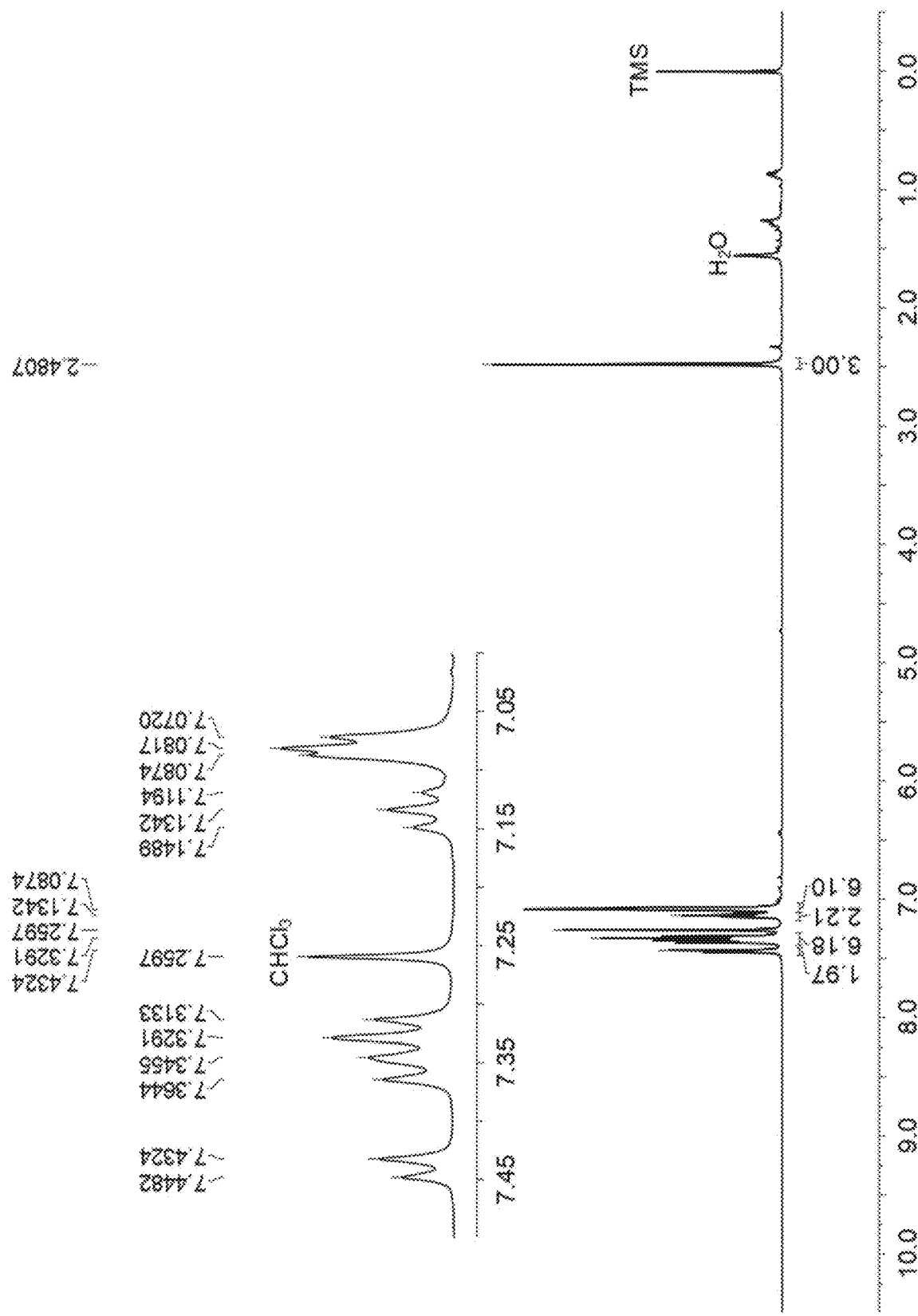
FIG. 2 is an $^1$H-NMR spectrum of a compound 7 synthesized in First Embodiment (with deuterated chloroform as a solvent)
Figure 3:
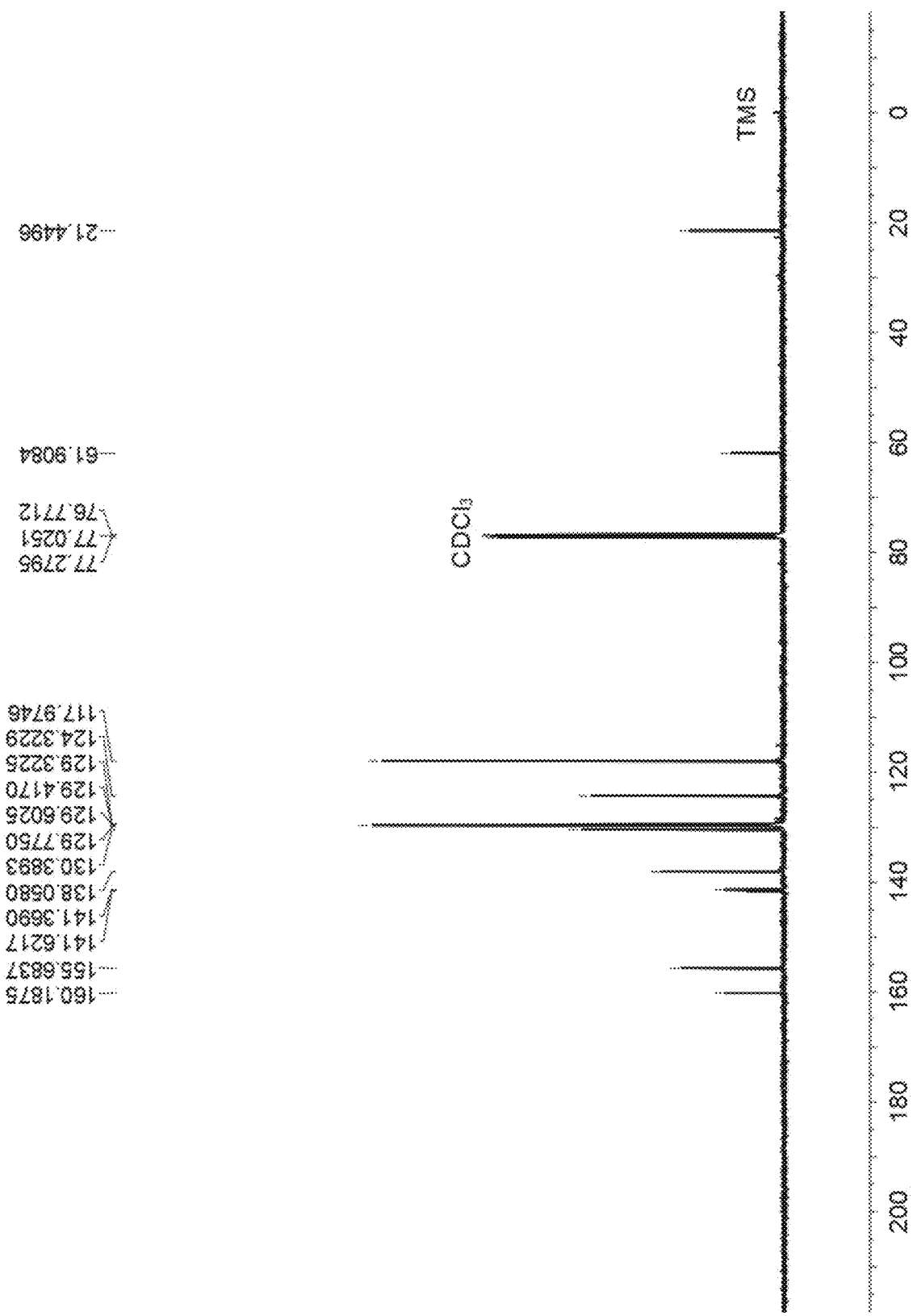
FIG. 3 is a $^{13}$C-NMR spectrum of the compound 7 synthesized in First Embodiment (with deuterated chloroform as a solvent)
Figure 4:
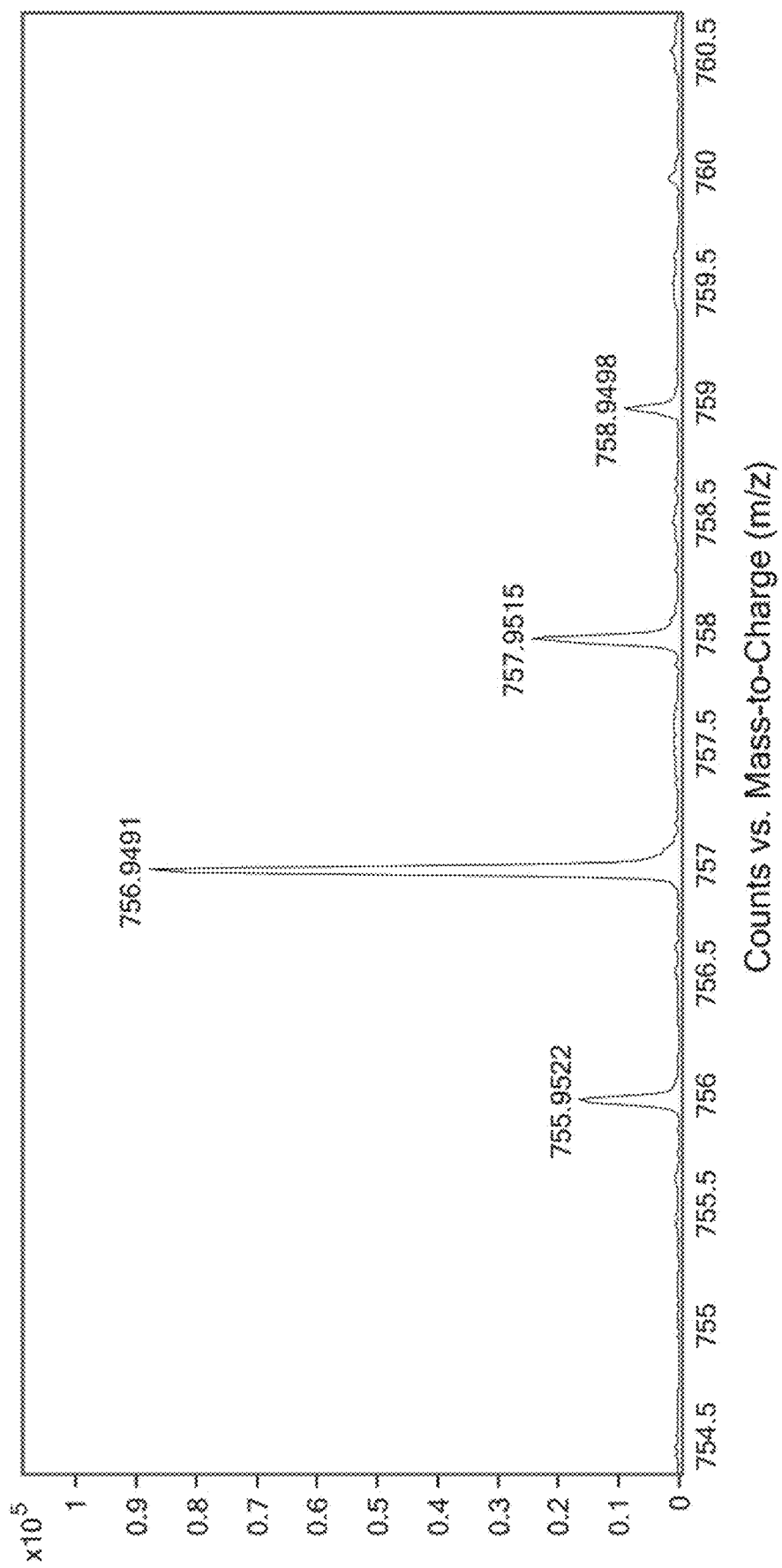
FIG. 4 is a high resolution mass spectrum of the compound 7 synthesized in First Embodiment.
Figure 5:
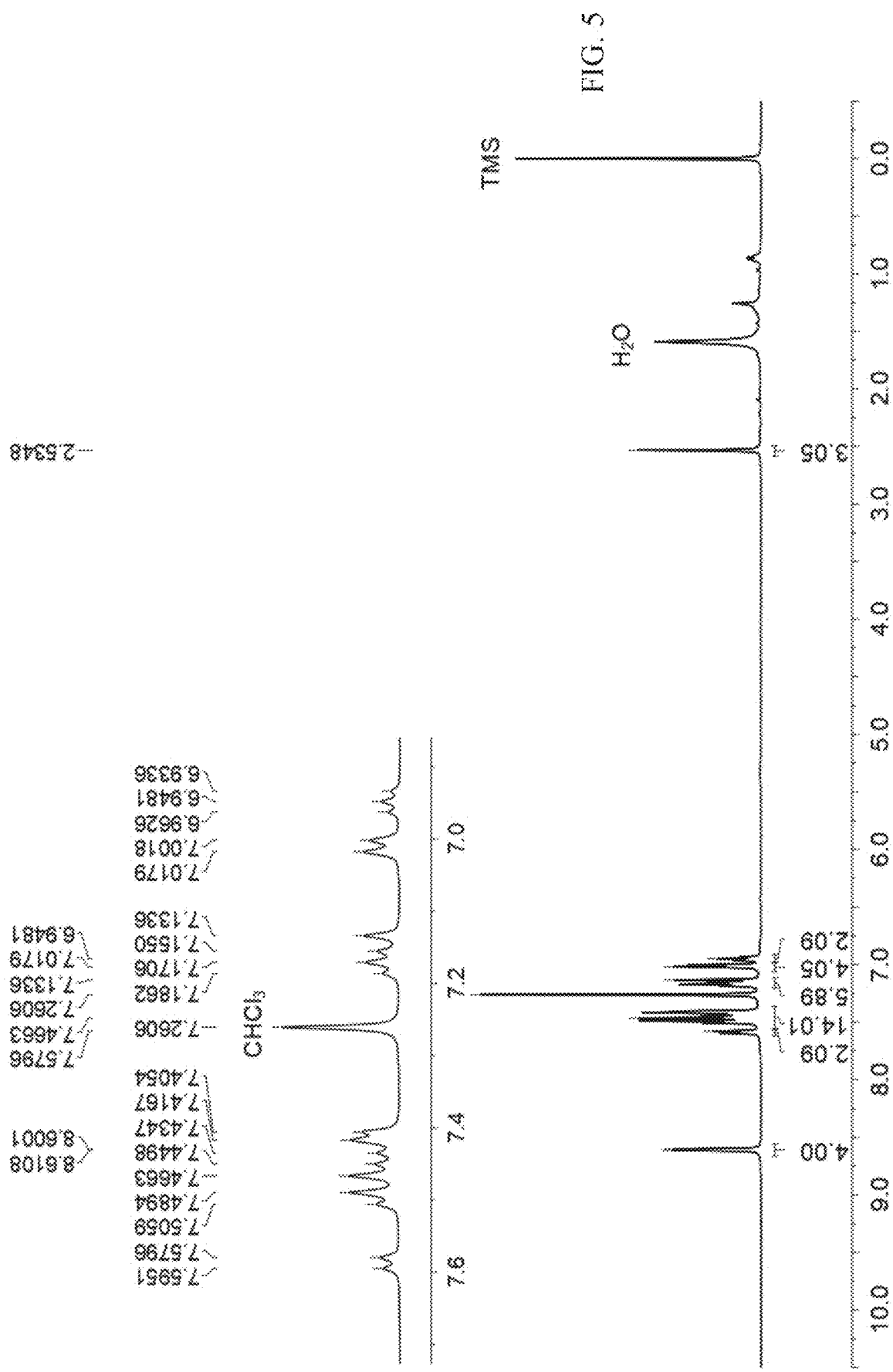
FIG. 5 is an $^1$H-NMR spectrum of a pyridine ligand 3 synthesized in First Embodiment (with deuterated chloroform as a solvent)
Figure 6:
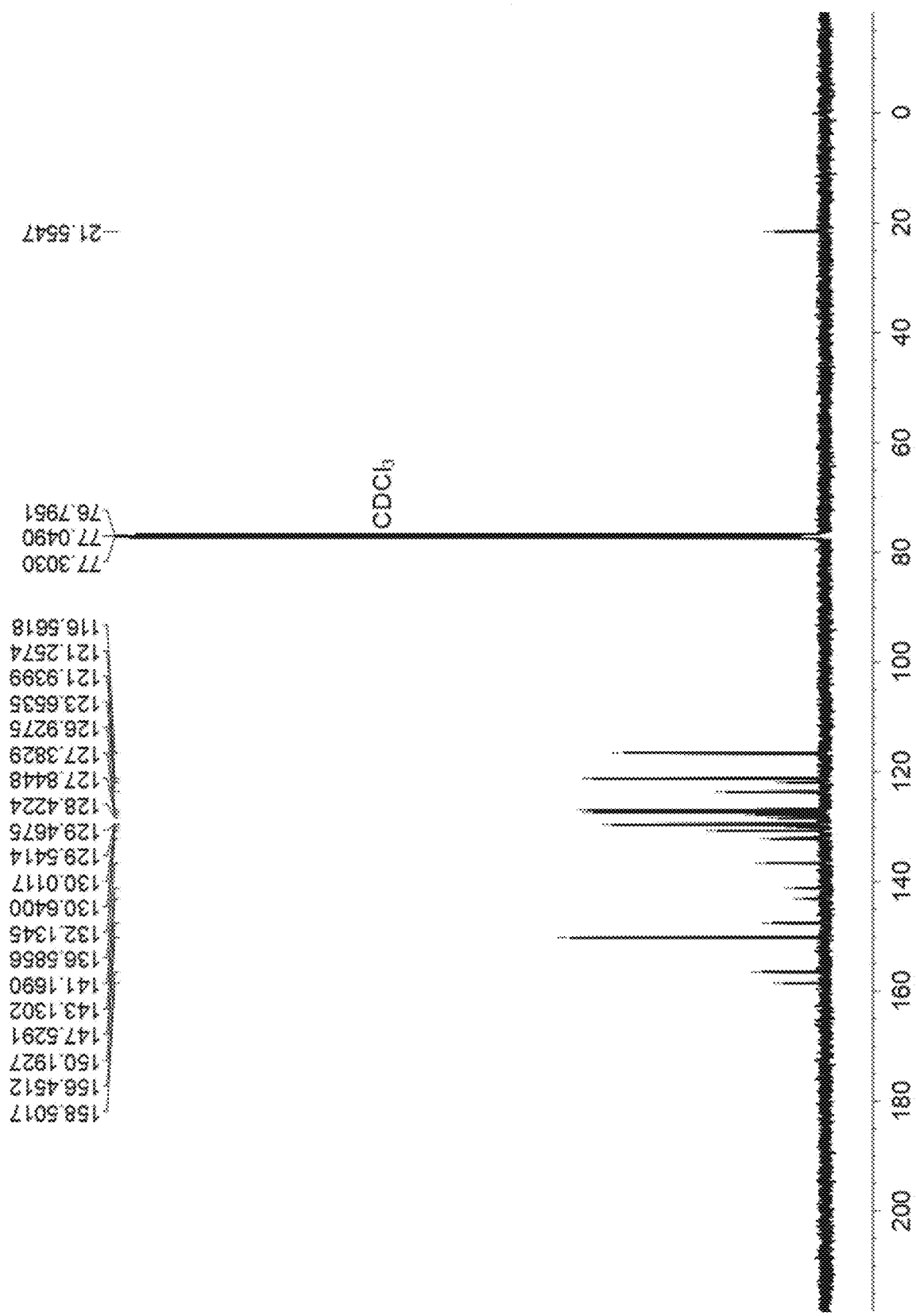
FIG. 6 is a $^{13}$C-NMR spectrum of the pyridine ligand 3 synthesized in First Embodiment (with deuterated chloroform as a solvent)
Figure 7:
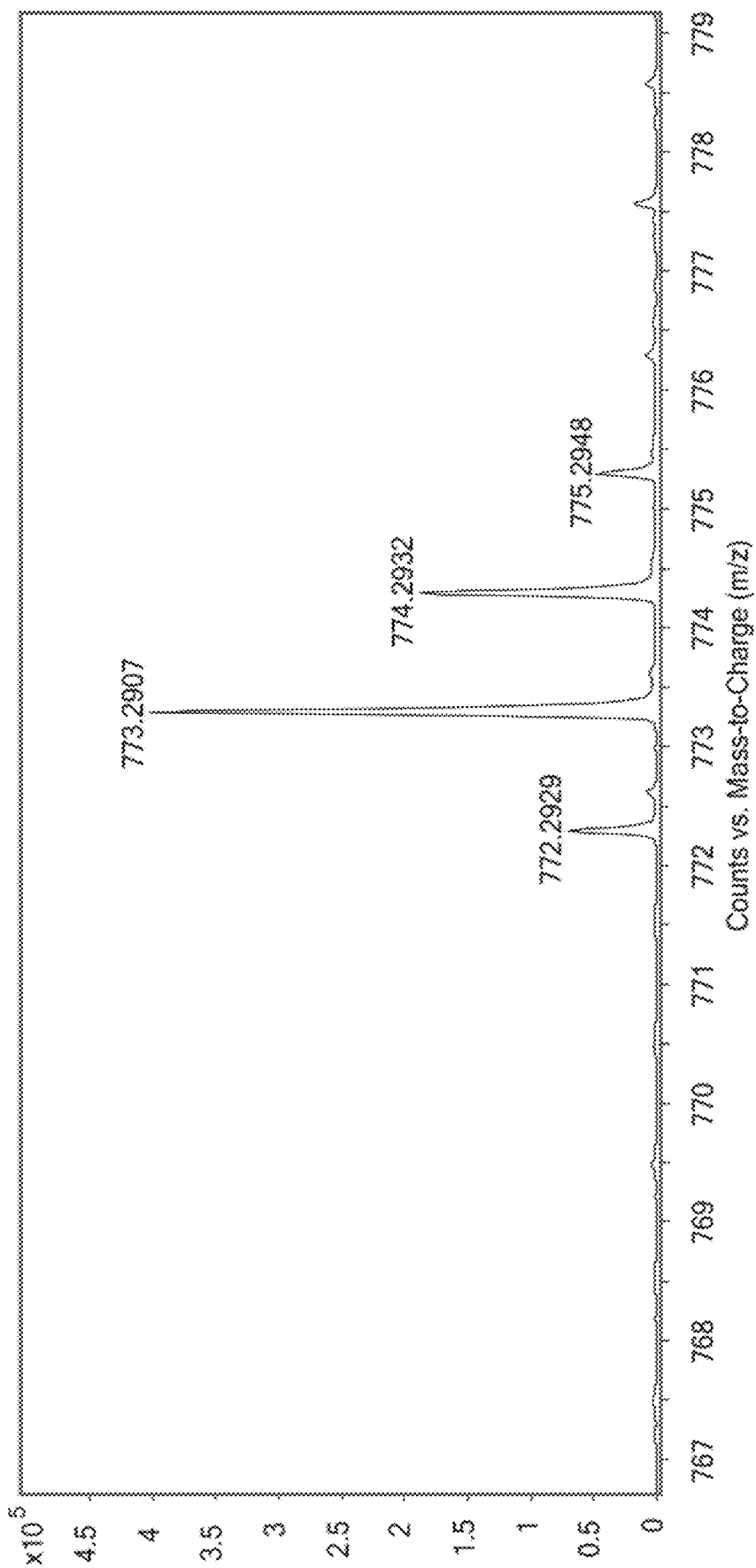
FIG. 7 is a high resolution mass spectrum of the pyridine ligand 3 synthesized in First Embodiment.
Figure 8:
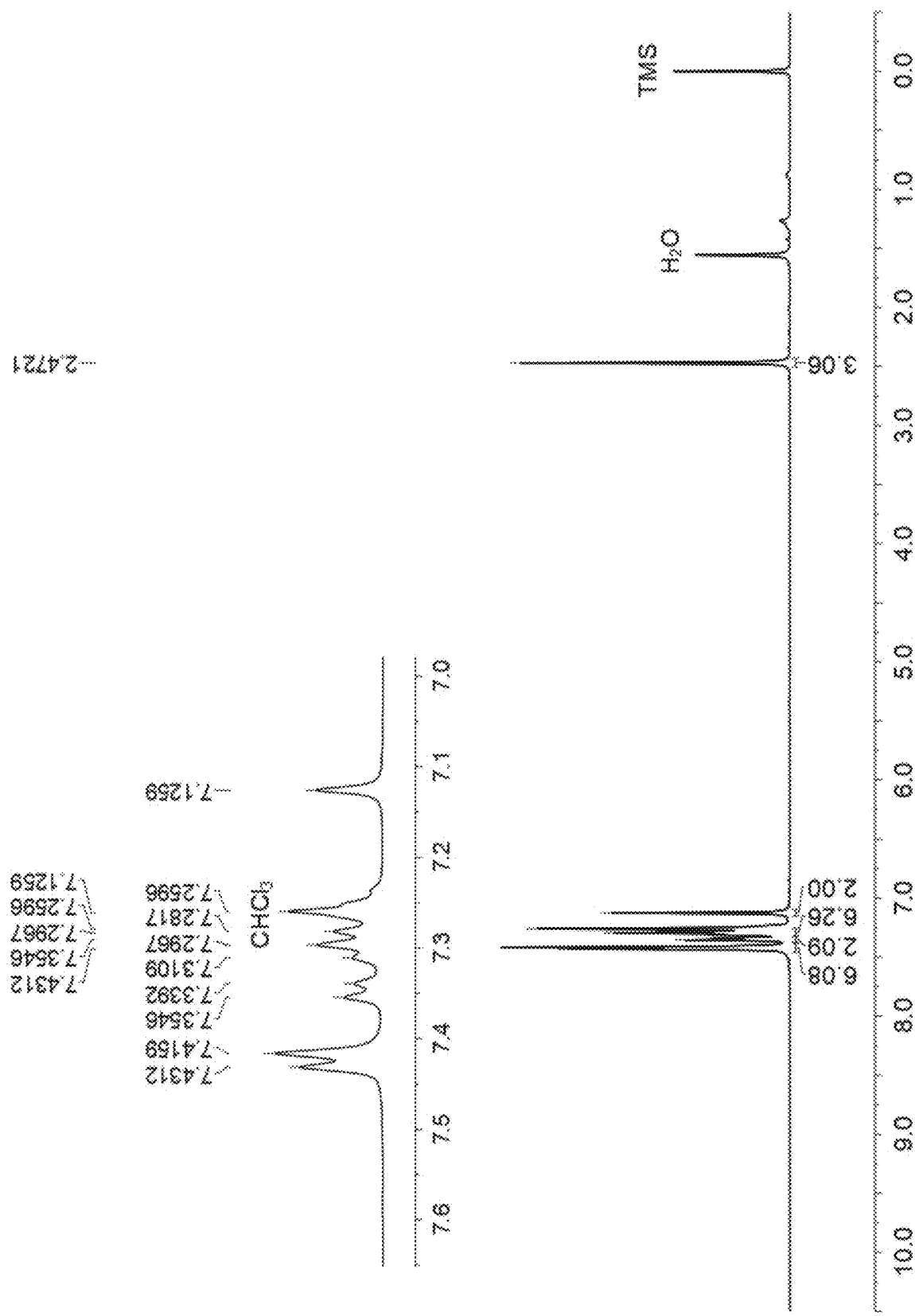
FIG. 8 is an $^1$H-NMR spectrum of a compound 8 synthesized in First Embodiment (with deuterated chloroform as a solvent)
Figure 9:
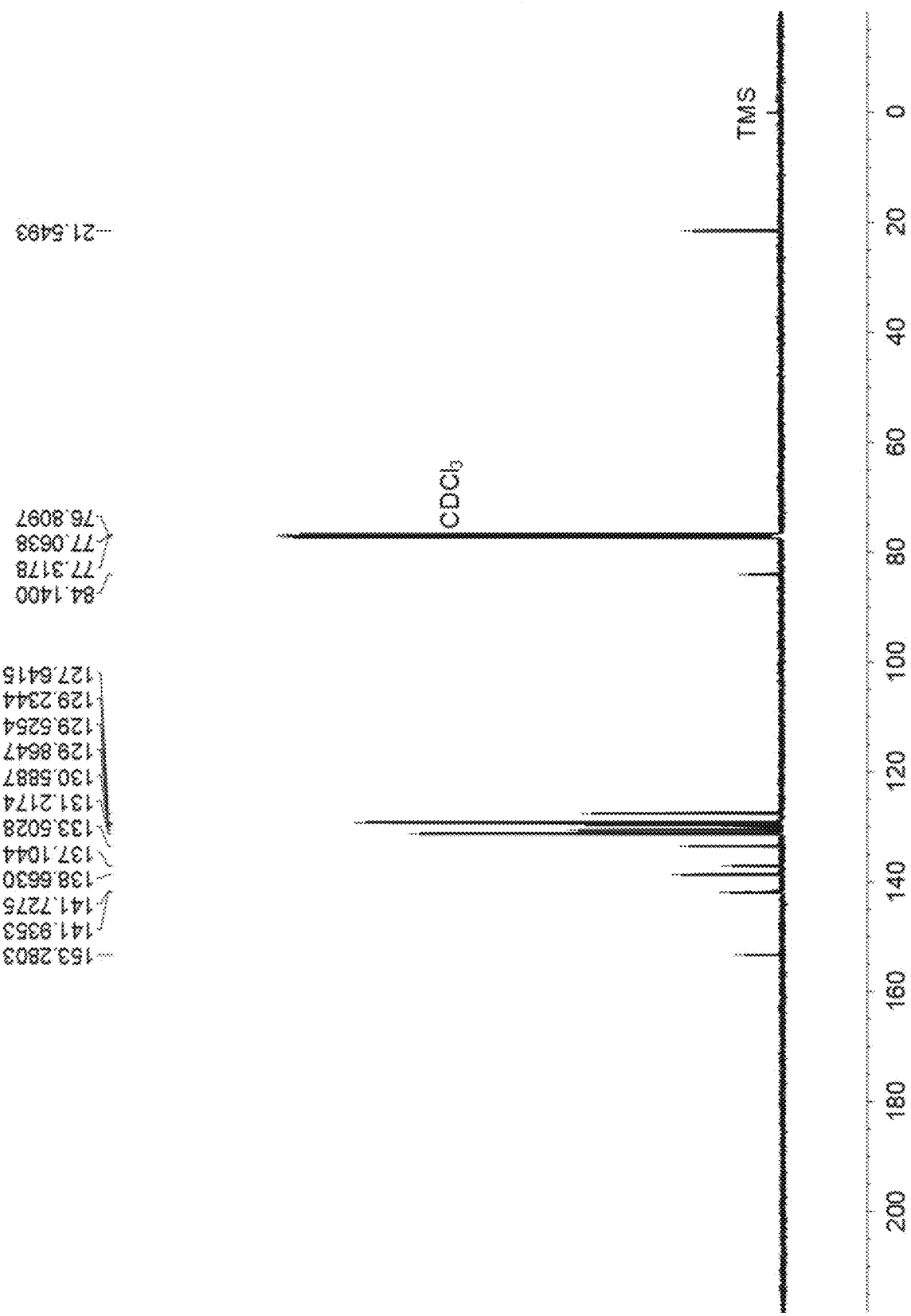
FIG. 9 is a $^{13}$C-NMR spectrum of the compound 8 synthesized in First Embodiment (with deuterated chloroform as a solvent)
Figure 10:
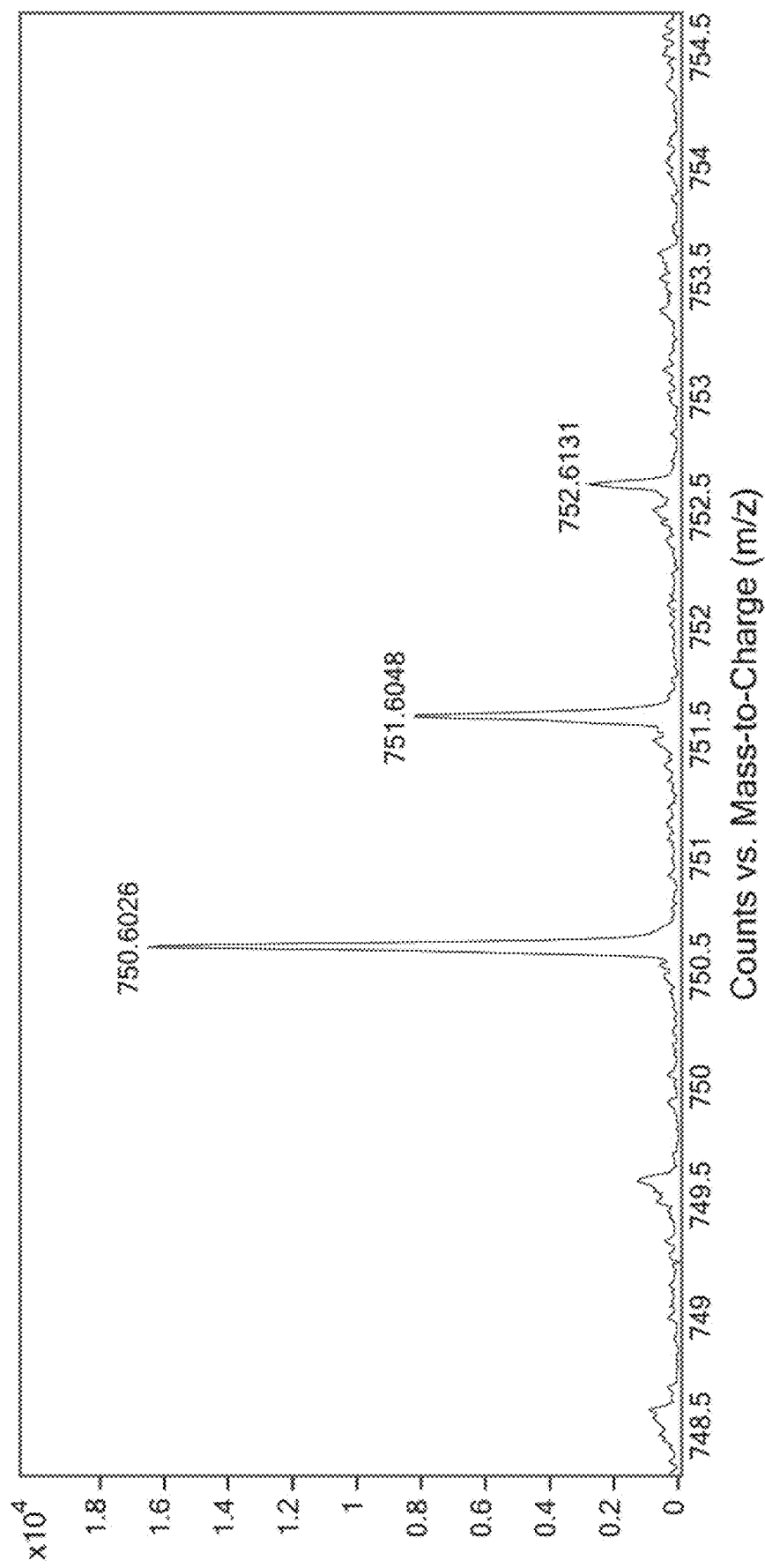
FIG. 10 is a high resolution mass spectrum of the compound 8 synthesized in First Embodiment.
Figure 11:
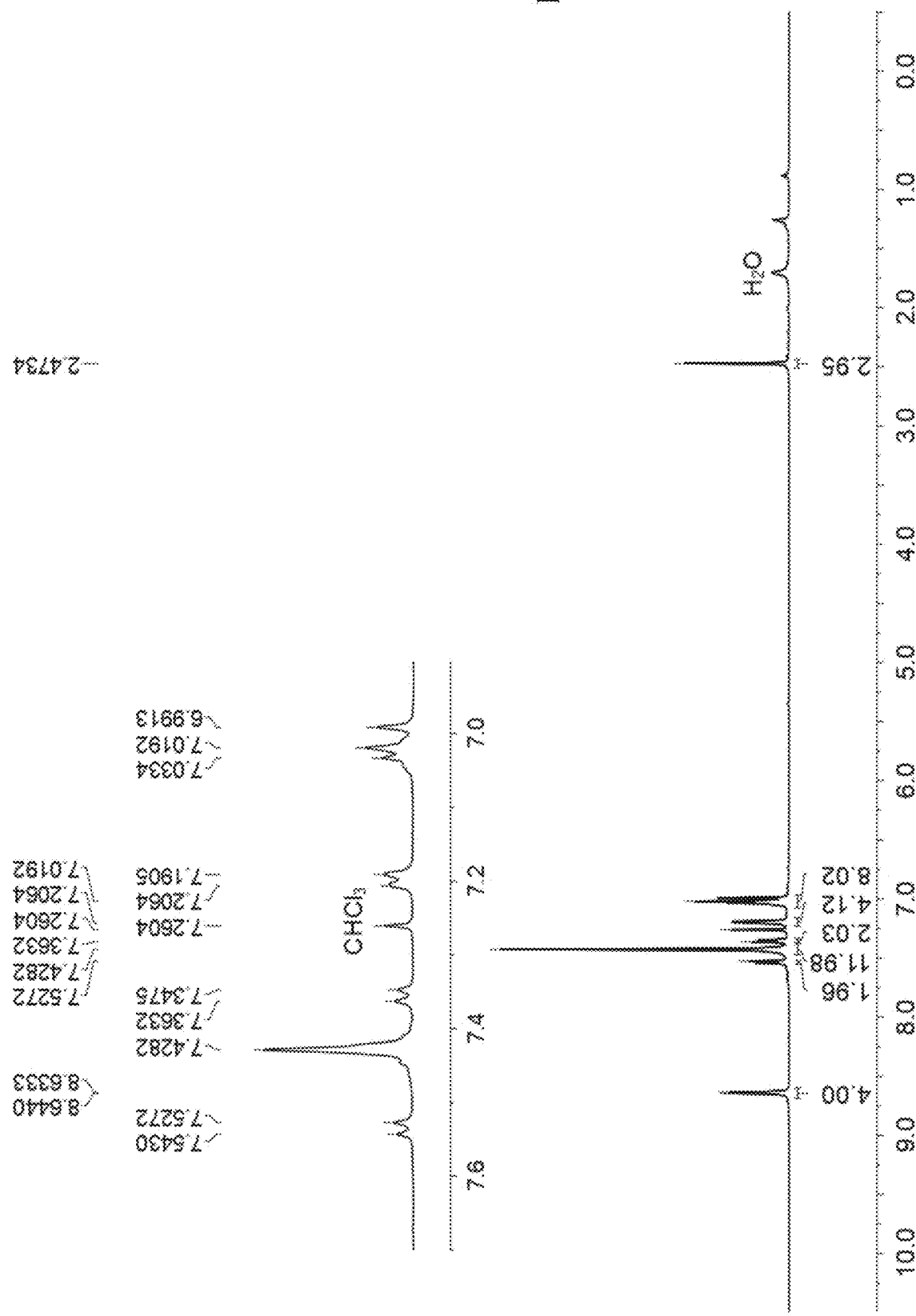
FIG. 11 is an $^1$H-NMR spectrum of a pyridine ligand 4 synthesized in First Embodiment (with deuterated chloroform as a solvent)
Figure 12:
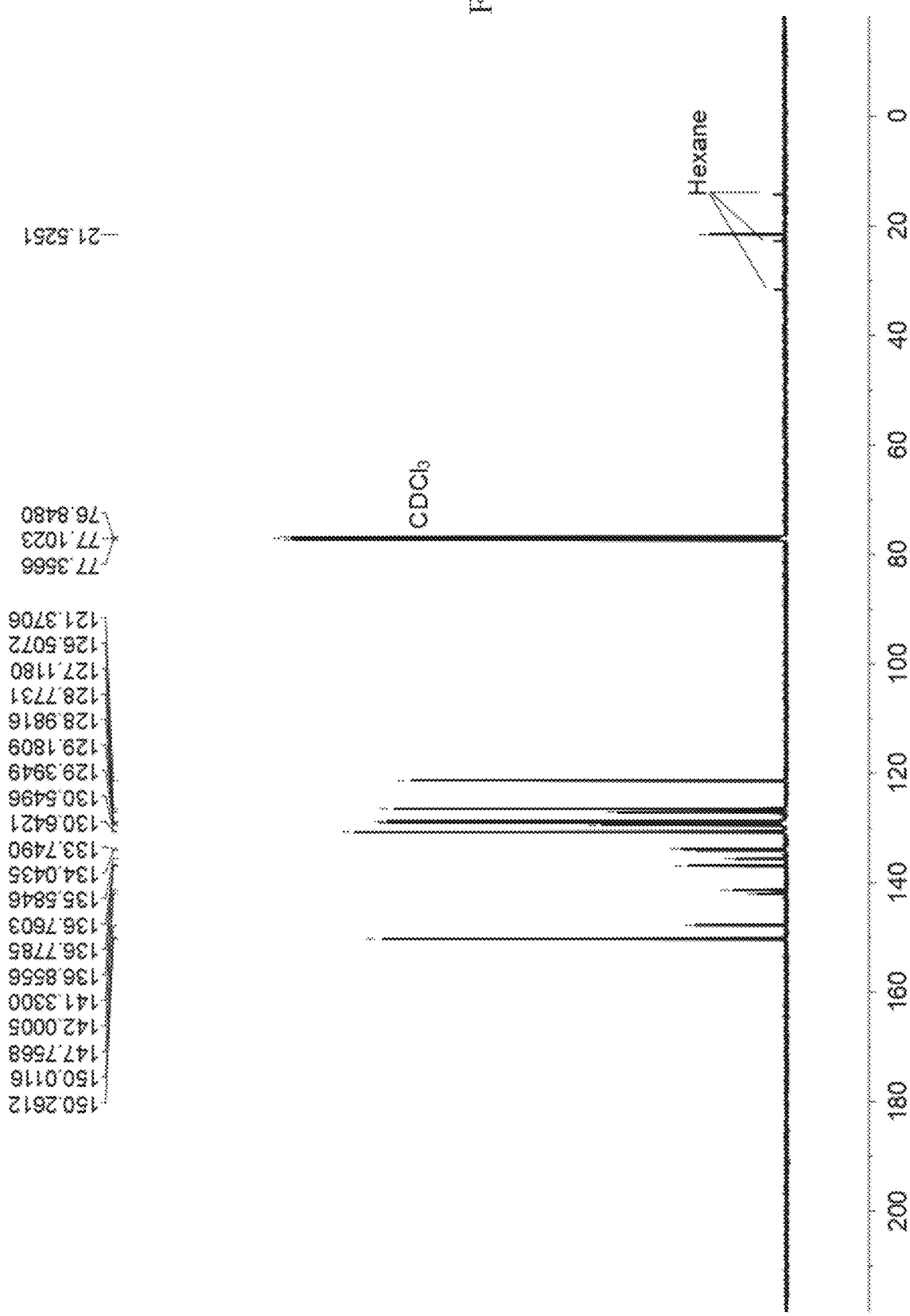
FIG. 12 is a $^{13}$C-NMR spectrum of the pyridine ligand 4 synthesized in First Embodiment (with deuterated chloroform as a solvent)
Figure 13:
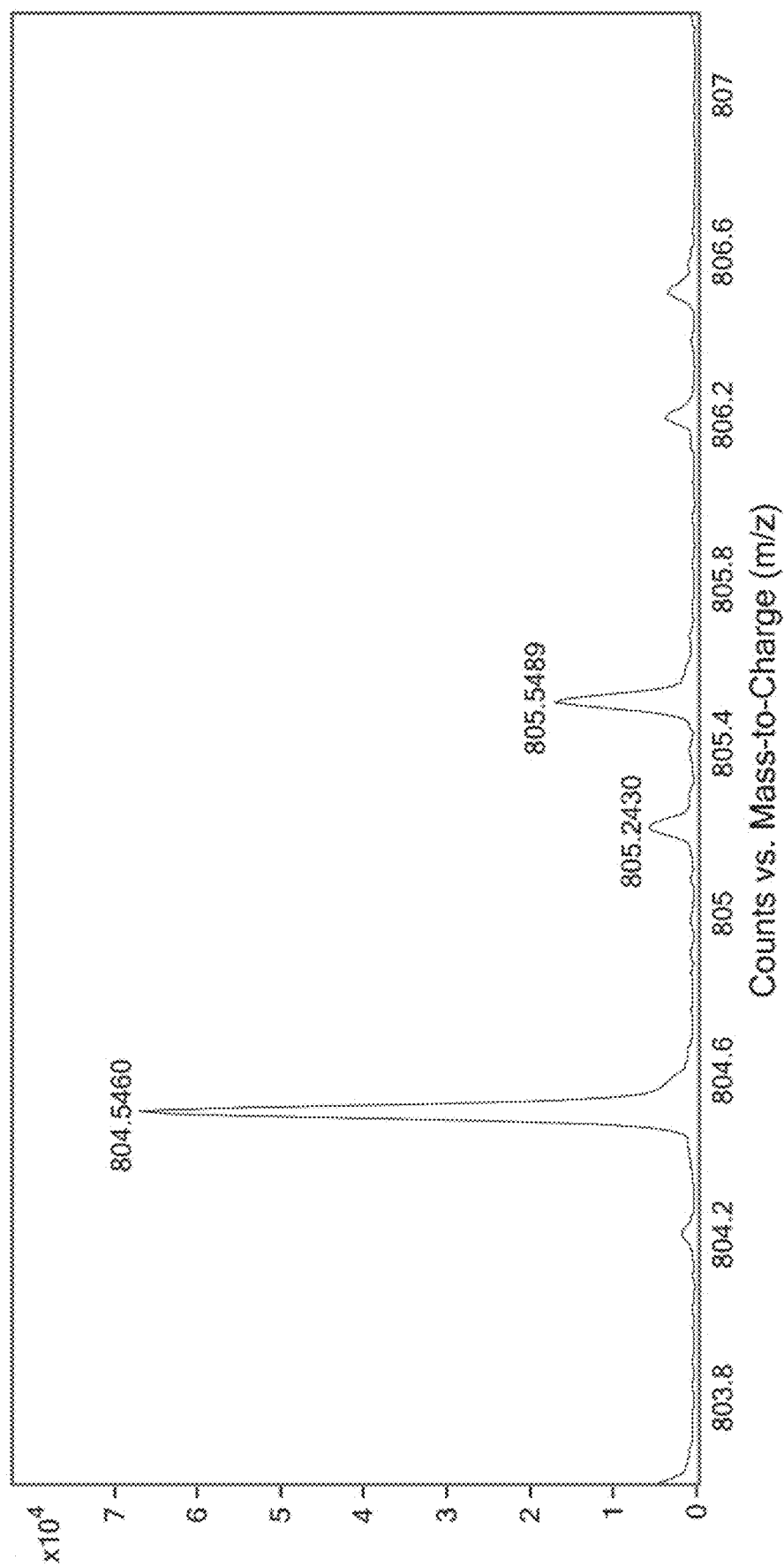
FIG. 13 is a high resolution mass spectrum of the pyridine ligand 4 synthesized in First Embodiment.

FIG. 1 is an $^1$H-NMR spectrum of the compound 6 synthesized in First Embodiment (with deuterated chloroform as a solvent);

FIG. 2 is an $^1$H-NMR spectrum of the compound 7 synthesized in First Embodiment (with deuterated chloroform as a solvent);

FIG. 3 is a $^{13}$C-NMR spectrum of the compound 7 synthesized in First Embodiment (with deuterated chloroform as a solvent);

FIG. 4 is a high resolution mass spectrum of the compound 7 synthesized in First Embodiment;

FIG. 5 is an $^1$H-NMR spectrum of the pyridine ligand 3 synthesized in First Embodiment (with deuterated chloroform as a solvent);

FIG. 6 is a $^{13}$C-NMR spectrum of the pyridine ligand 3 synthesized in First Embodiment (with deuterated chloroform as a solvent);

FIG. 7 is a high resolution mass spectrum of the pyridine ligand 3 synthesized in First Embodiment;

FIG. 8 is an $^1$H-NMR spectrum of the compound 8 synthesized in First Embodiment (with deuterated chloroform as a solvent);

FIG. 9 is a $^{13}$C-NMR spectrum of the compound 8 synthesized in First Embodiment (with deuterated chloroform as a solvent);

FIG. 10 is a high resolution mass spectrum of the compound 8 synthesized in First Embodiment;

FIG. 11 is an $^1$H-NMR spectrum of the pyridine ligand 4 synthesized in First Embodiment (with deuterated chloroform as a solvent);

FIG. 12 is a $^{13}$C-NMR spectrum of the pyridine ligand 4 synthesized in First Embodiment (with deuterated chloroform as a solvent); and FIG. 13 is a high resolution mass spectrum of the pyridine ligand 4 synthesized in First Embodiment.

Second Embodiment

Preparation of Supramolecular Metallacycle 1 Based on BODIPY:

A BODIPY ligand 3 (20.0 mg, 0.026 mmol) and a platinum acceptor 5 (36.2 mg, 0.026 mmol) were dissolved in 0.5 mL of dimethyl sulfoxide (DMSO) to react at 50° C. for 12 hours. After reaction, the product was cooled to room temperature and filtered, and a filtrate was added with anhydrous ether to reduce the solubility of the product for precipitation. After centrifugation, an upper layer supernatant was poured out, and the remaining solid product was pumped by an oil pump to obtain a powdery solid (55 mg, 98%).

$^1$H NMR (500 MHz, DMSO-d$_6$, 297 K): 8.83 (t, 18H), 8.09 (s, 12H), 7.93 (m, 9H), 7.83 (m, 21H), 7.71 (m, 12H), 7.59 (m, 12H), 7.29 (m, 12H), 7.04 (m, 18H), 4.00 (s, 18H), 2.56 (s, 9H), 1.31 (s, 72H), 1.08 (m, 108H). $^{31}$P NMR (202 MHz, DMSO-d$_6$, 297 K): 13.70 ppm (s, $^{195}$Pt satellites, $^1$J$_{Pt-P}$=2669.4 Hz). ESI-TOF-MS: m/z 1152.72 [1–OTf]$^{5+}$, 1478.16 [1–OTf]$^{4+}$.

Preparation of Supramolecular Metallacycle 2 Based on BODIPY:

A BODIPY ligand 4 (20.0 mg, 0.025 mmol) and a platinum acceptor 5 (34.7 mg, 0.025 mmol) were dissolved in 0.5 mL of dimethyl sulfoxide (DMSO), and the solution reacted at 50° C. for 12 hours. After reaction, the product was cooled to room temperature and filtered to remove insoluble solid impurities, and a filtrate was added with anhydrous ether to reduce the solubility of the product for precipitation. After centrifugation, an upper layer supernatant was poured out, and the remaining solid product was pumped by an oil pump to obtain a powdery solid (54 mg, 98%).

$^1$H NMR (500 MHz, DMSO-d$_6$, 297 K): 8.88-8.81 (m, 18H), 8.10 (s, 12H), 8.89-8.80 (m, 32H), 7.72 (m, 6H), 7.53 (m, 6H), 7.37 (m, 6H), 7.21 (m, 24H), 7.13 (m, 9H), 4.01 (s, 18H), 2.50 (s, 9H), 1.34 (m, 72H), 1.11 (m, 108H). $^{31}$P NMR (202 MHz, DMSO-d$_6$, 297 K): 13.80 ppm (s, $^{195}$Pt satellites, $^1$J$_{Pt-P}$=2674.9 Hz). ESI-TOF-MS: m/z 1171.89 [2–5OTf]$^{5+}$, 1502.13 [2–4OTf]$^{4+}$.

Figure 14:
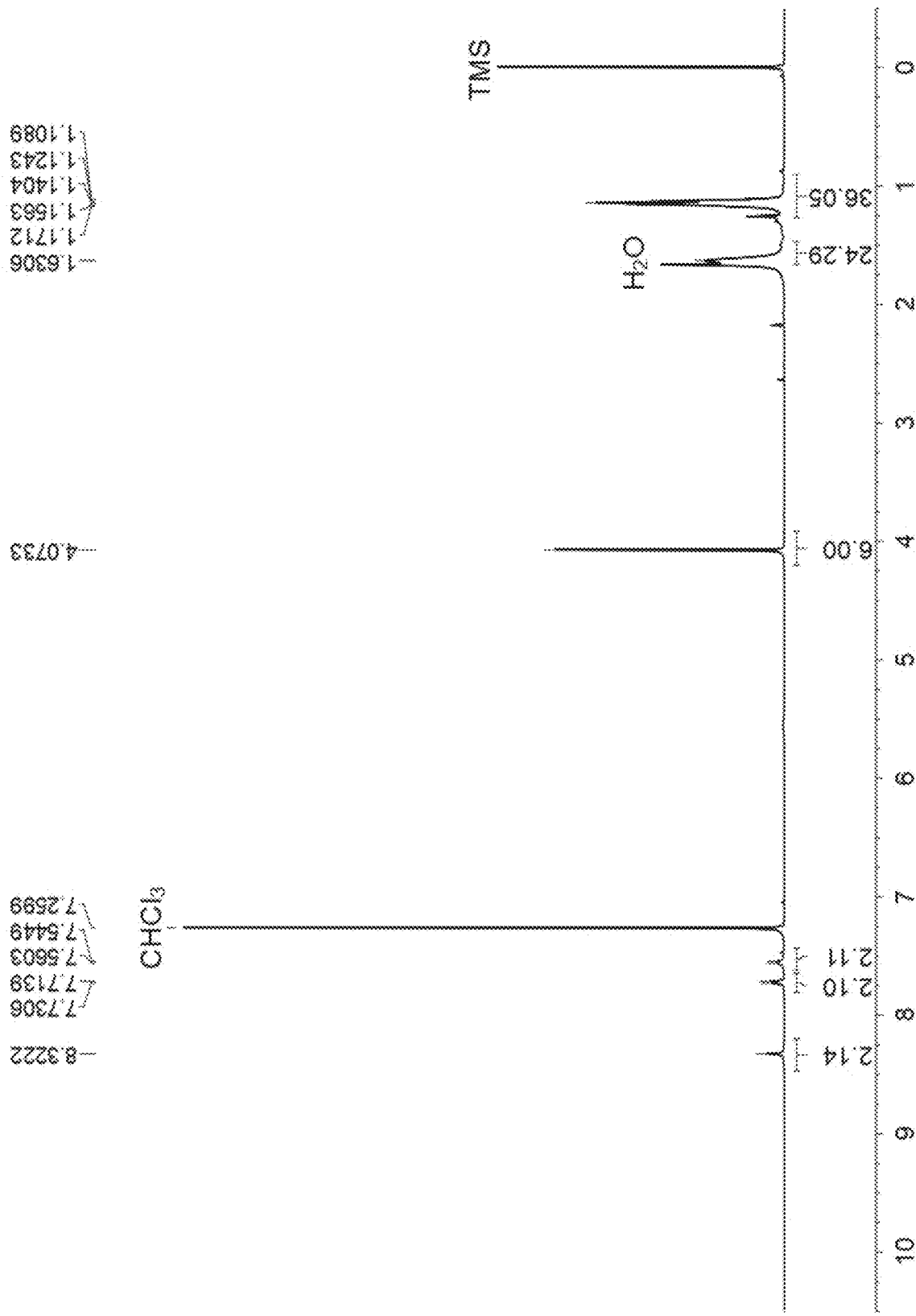
FIG. 14 is an $^1$H-NMR spectrum of an organic platinum electron acceptor 5 synthesized in Second Embodiment (with deuterated chloroform as a solvent)
Figure 15:
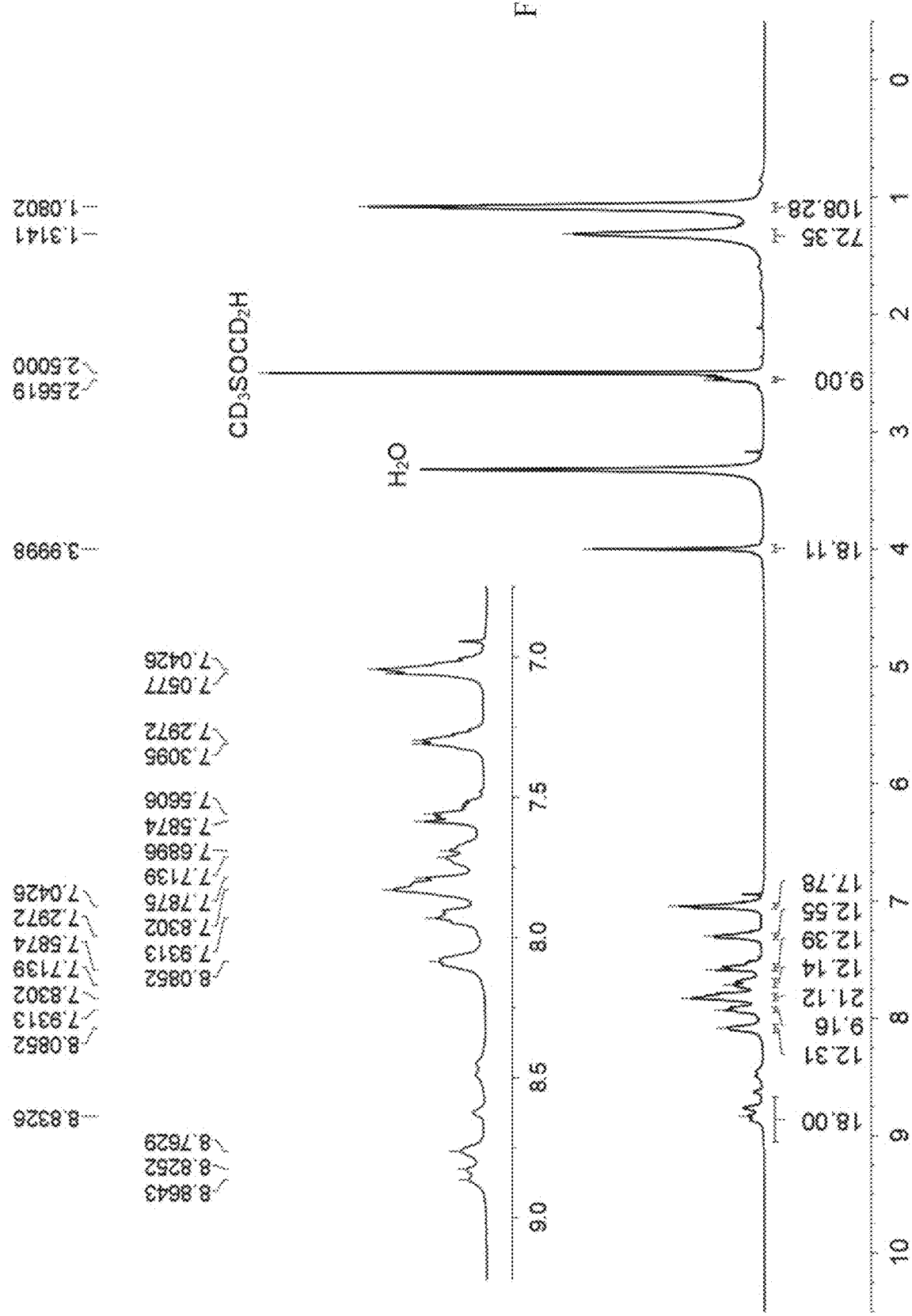
FIG. 15 is an $^1$H-NMR spectrum of a compound 1 synthesized in Second Embodiment (with deuterated dimethyl sulfoxide as a solvent)
Figure 16:
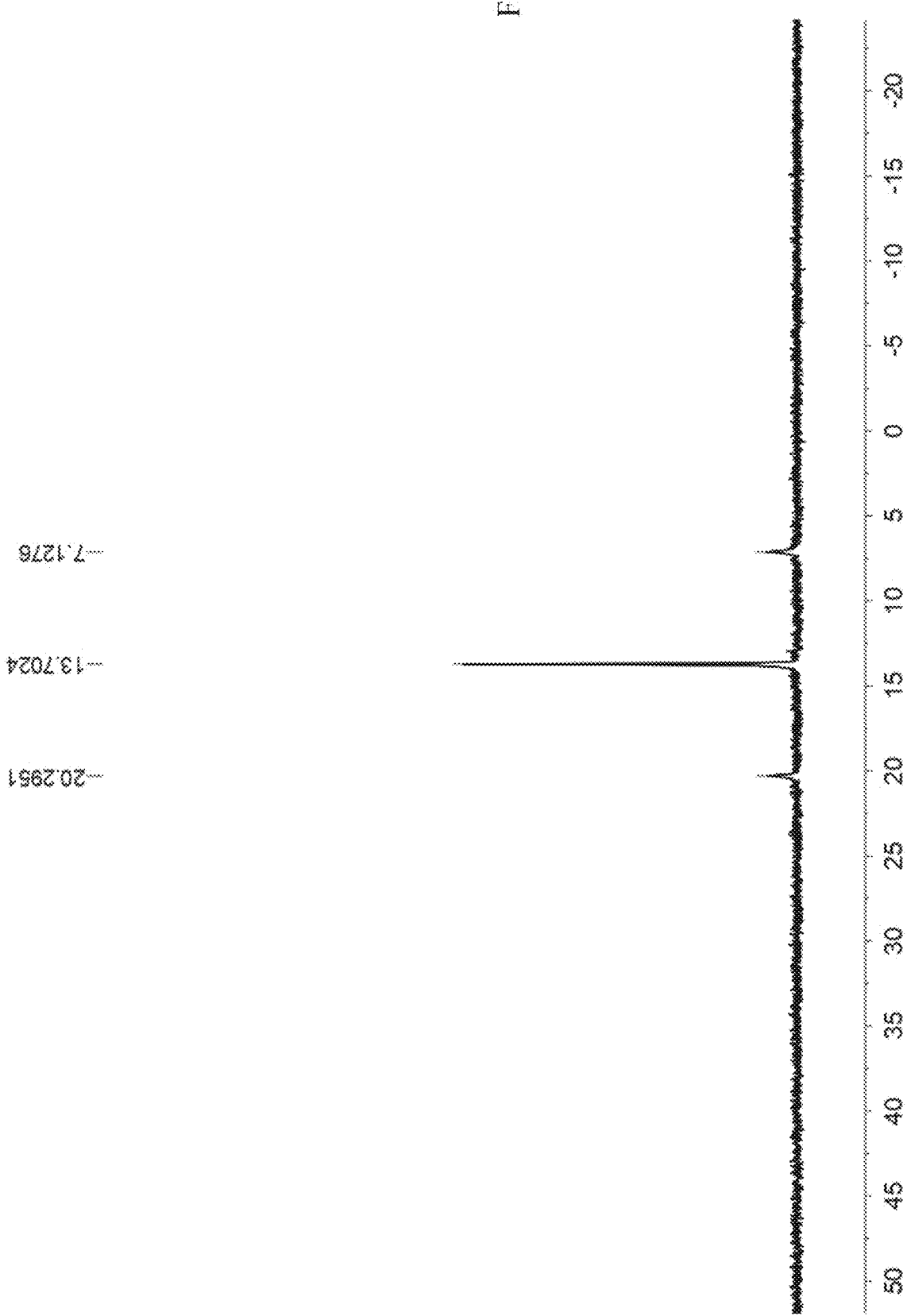
FIG. 16 is a $^{31}$P-NMR spectrum of the compound 1 synthesized in Second Embodiment (with deuterated dimethyl sulfoxide as a solvent)
Figure 17:
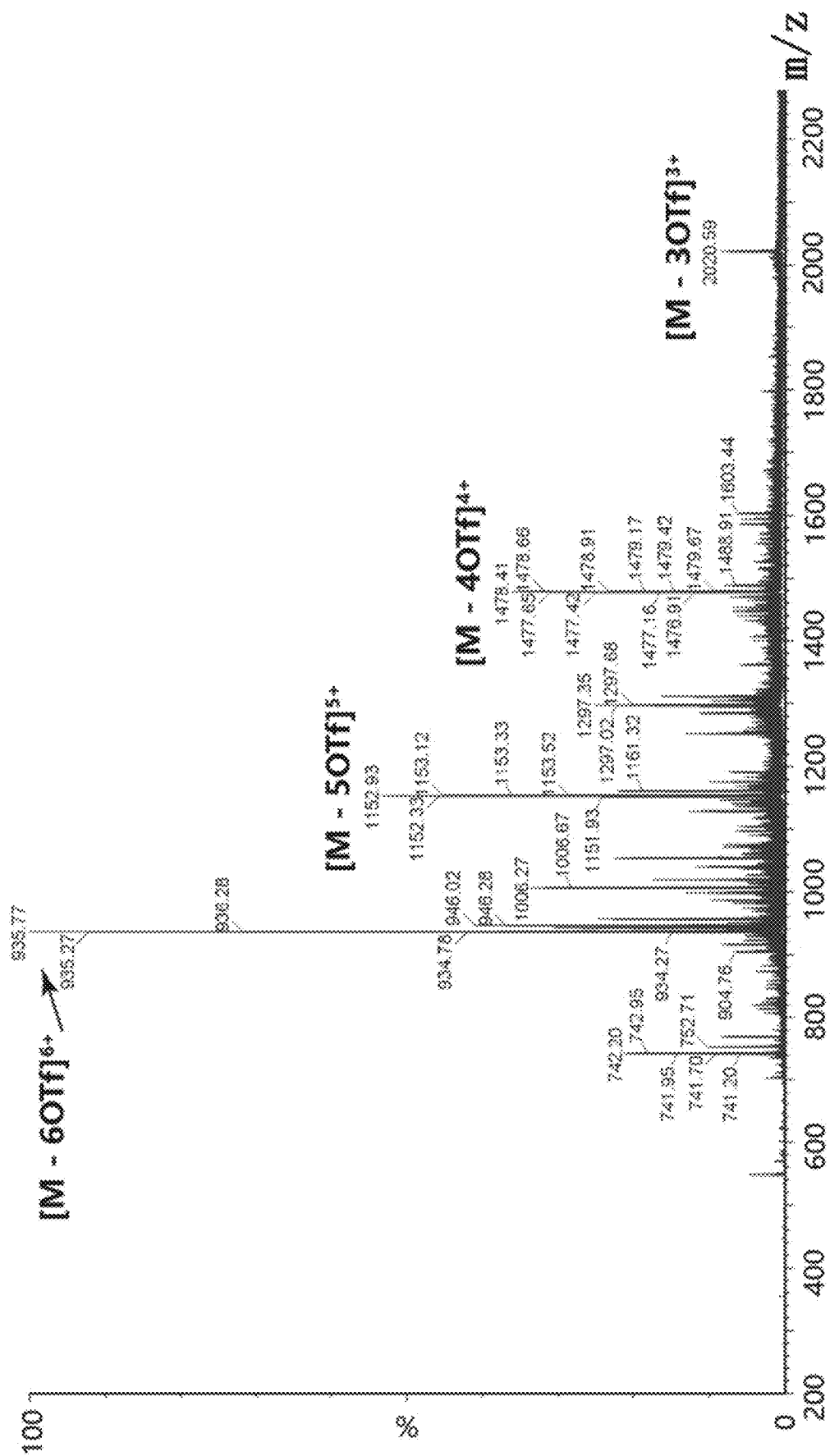
FIG. 17 is a mass spectrum of a platinum acceptor 1 synthesized in Second Embodiment.
Figure 18:
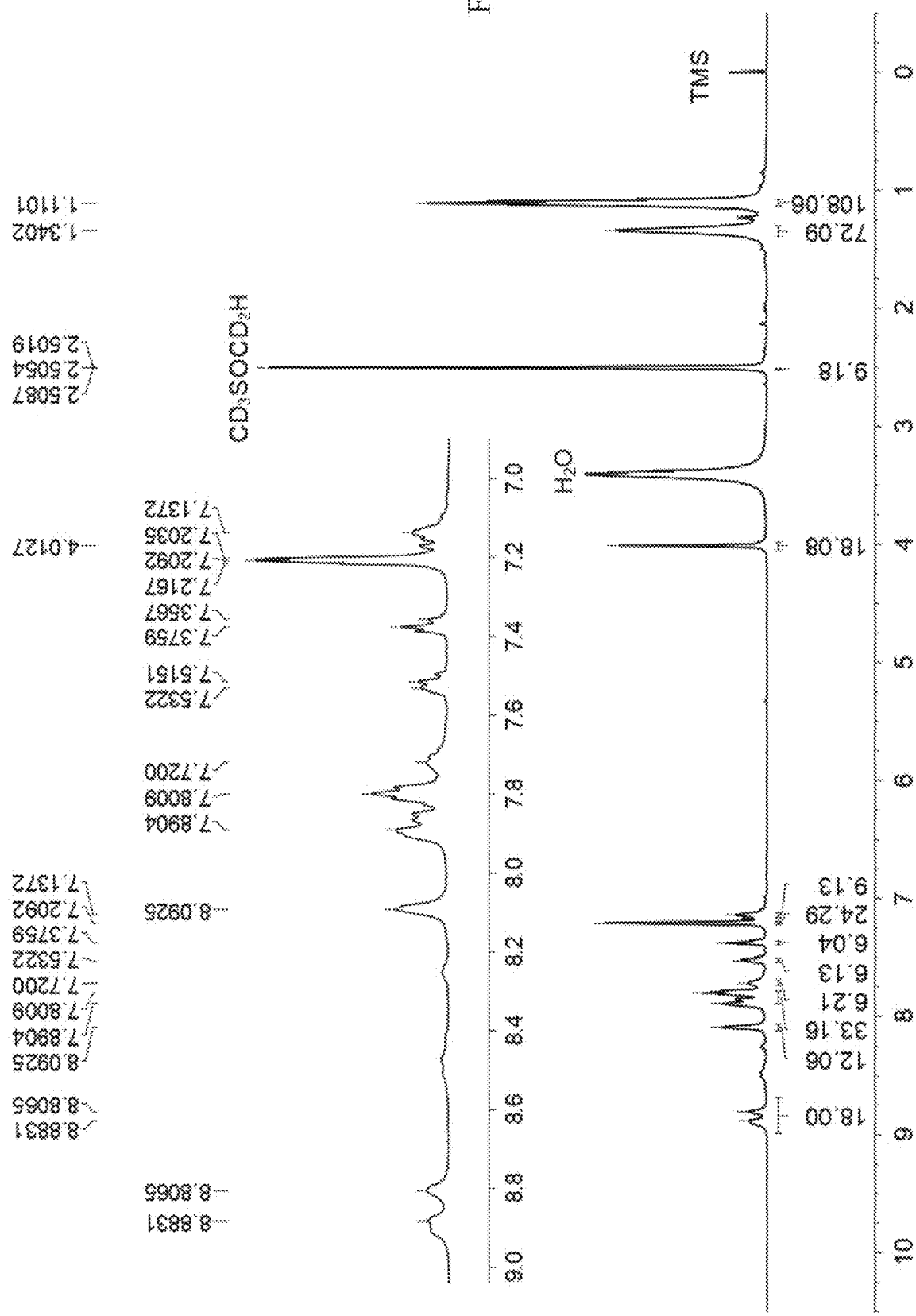
FIG. 18 is an $^1$H-NMR spectrum of a metallacycle 2 synthesized in Second Embodiment (with deuterated dimethyl sulfoxide as a solvent)
Figure 19:
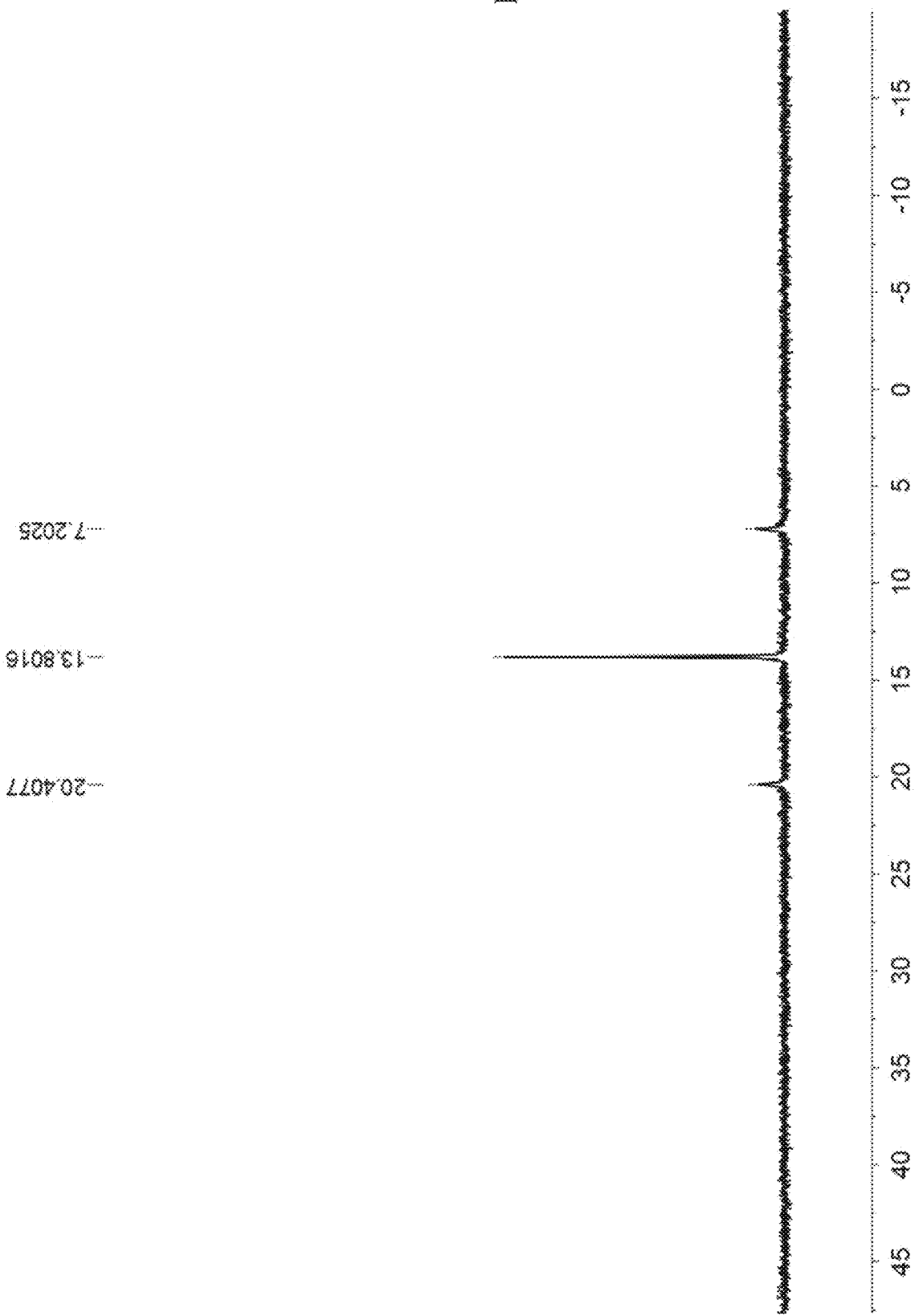
FIG. 19 is a $^{31}$P-NMR spectrum of the metallacycle 2 synthesized in Second Embodiment (with deuterated dimethyl sulfoxide as a solvent)
Figure 20:
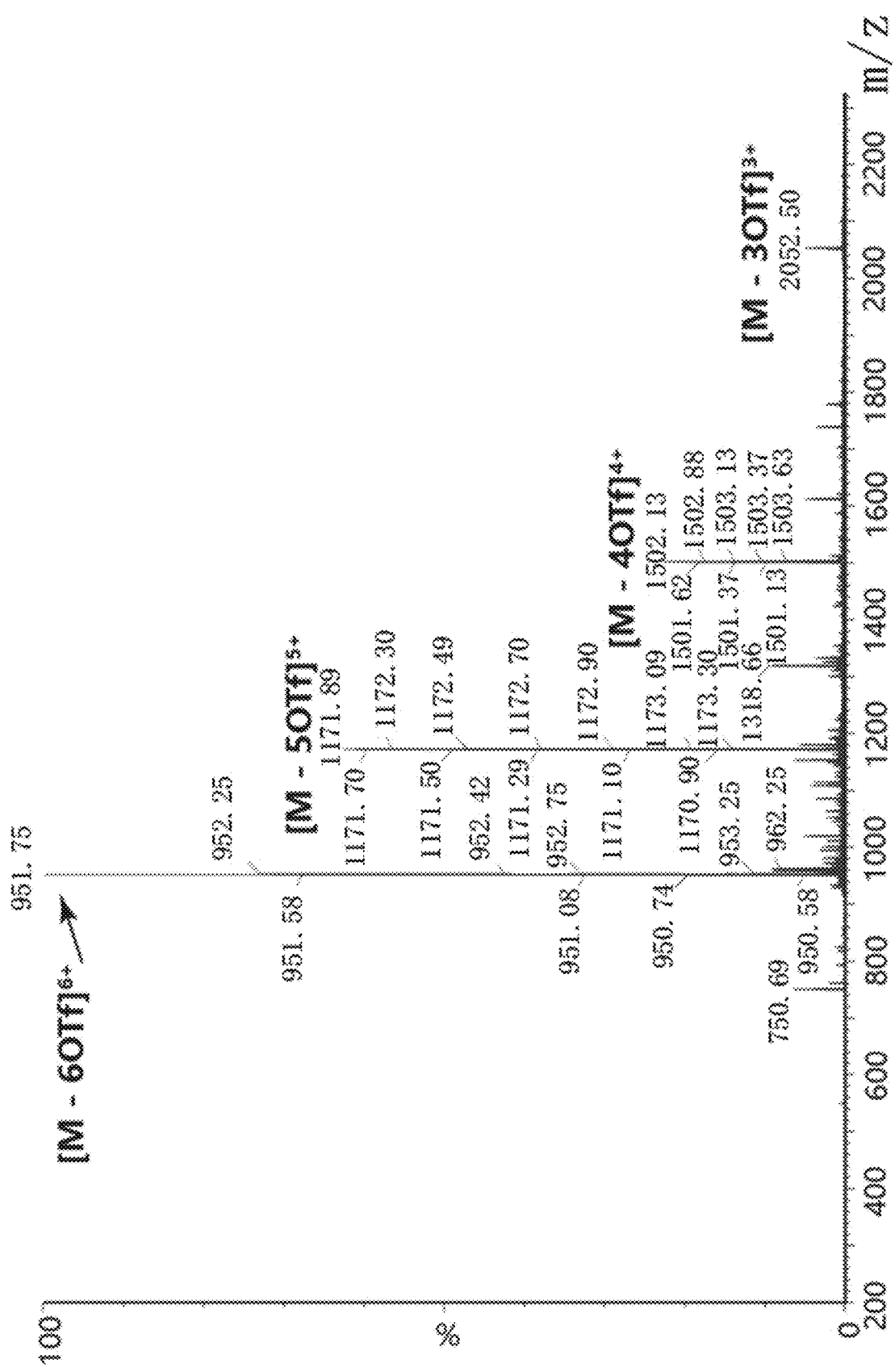
FIG. 20 is a mass spectrum of the metallacycle 2 synthesized in Second Embodiment.

FIG. 14 is an $^1$H-NMR spectrum of the organic platinum electron acceptor 5 synthesized in Second Embodiment (with deuterated chloroform as a solvent);

FIG. 15 is an $^1$H-NMR spectrum of the compound 1 synthesized in Second Embodiment (with deuterated dimethyl sulfoxide as a solvent);

FIG. 16 is a $^{31}$P-NMR spectrum of the compound 1 synthesized in Second Embodiment (with deuterated dimethyl sulfoxide as a solvent);

FIG. 17 is a mass spectrum of the platinum acceptor 1 synthesized in Second Embodiment;

FIG. 18 is an $^1$H-NMR spectrum of the metallacycle 2 synthesized in Second Embodiment (with deuterated dimethyl sulfoxide as a solvent);

FIG. 19 is a $^{31}$P-NMR spectrum of the metallacycle 2 synthesized in Second Embodiment (with deuterated dimethyl sulfoxide as a solvent); and FIG. 20 is a mass spectrum of the metallacycle 2 synthesized in Second Embodiment.

Third Embodiment

Cell Uptake Experiment and Singlet Oxygen Experiment of Metallacycles 1 and 2:

U87 cells were inoculated in a 24-well plate and cultured for 12 hours. A medium was removed, and a DMEM (Dulbecco modified Eagle medium) solution of a monomer 4 and a metallacycle 2 was added to co-culture for 24 hours. The cells were washed with PBS (phosphate buffer saline), and fixed with 4% formaldehyde solution for 10 minutes. The cells were washed with PBS, and added with DAPI (4′,6-diamidino-2-phenylindole) to co-culture for 10 minutes. The cells were washed with PBS twice, and finally observed by a CLSM (Confocal Laser Scanning Microscope).

U87 cells were inoculated in a 24-well plate and cultured for 12 hours. A medium was removed and a DMEM solution of a monomer 4 and a metallacycle 2 was added to co-incubate for 24 hours. The cells were washed with PBS, and added with a DCF-DA (reactive oxygen species fluorescent probe) solution to incubate for 30 minutes. The cells were washed with PBS, and added with a DMEM solution, the 24-well plate was exposed to an LED lamp with a wavelength of 600 nm to 605 nm for 1 minute, and then the fluorescence of each well was observed by a CLSM.

Figure 21A:
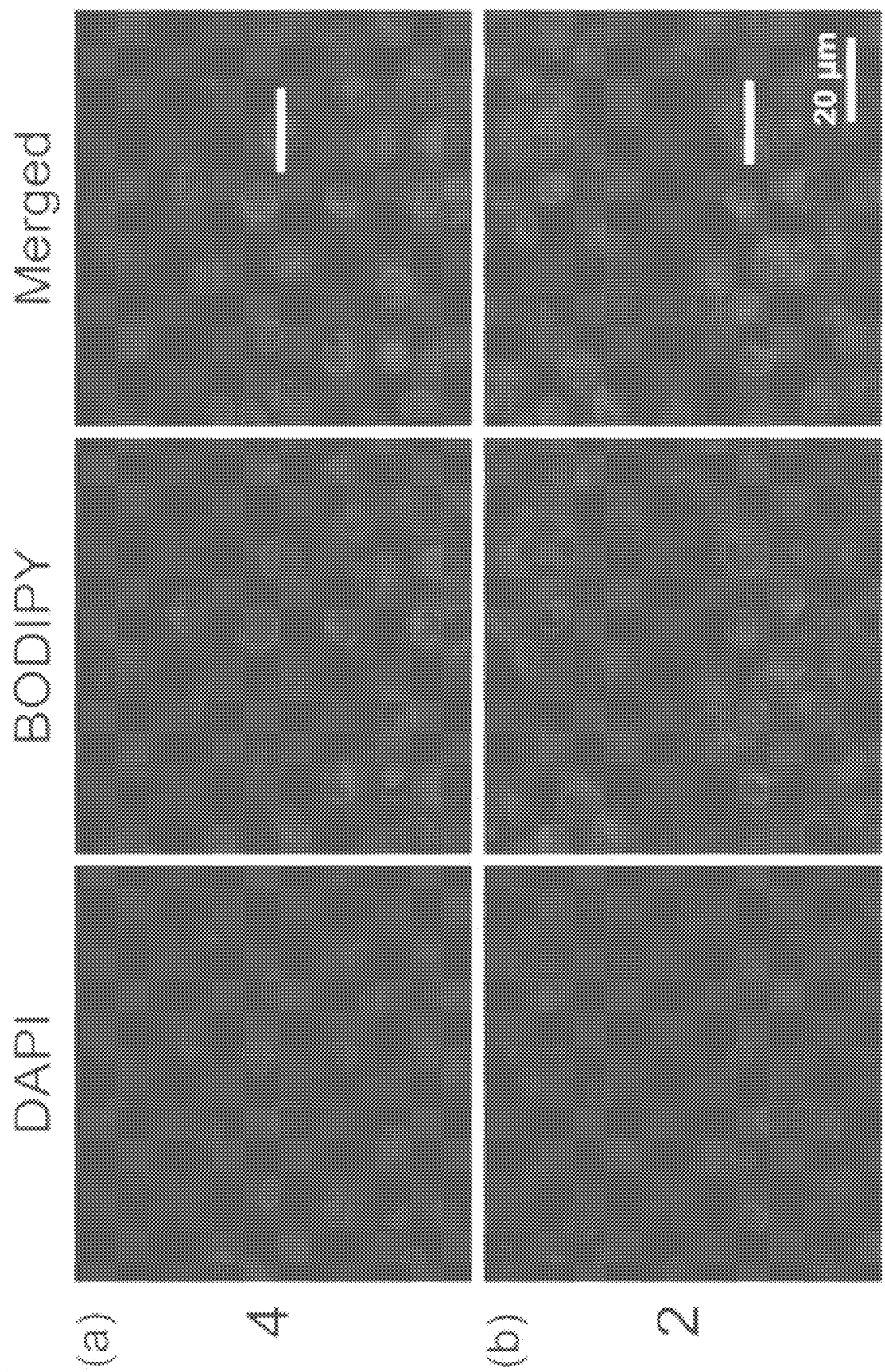
FIG. 21A is a confocal laser scanning microscope cell image of metallacycles 1 and 2 in Third Embodiment (the cell is a U87 cell), wherein, the first row corresponding to the U87 cell incubated with pyridine ligand 4, the second row corresponding to the U87 cell incubated with metallacycle 2, and the first column is DAPI channel, the second column is BODIPY channel, and the third column is merged DAPI channel and BODIPY channel.
Figure 21B:
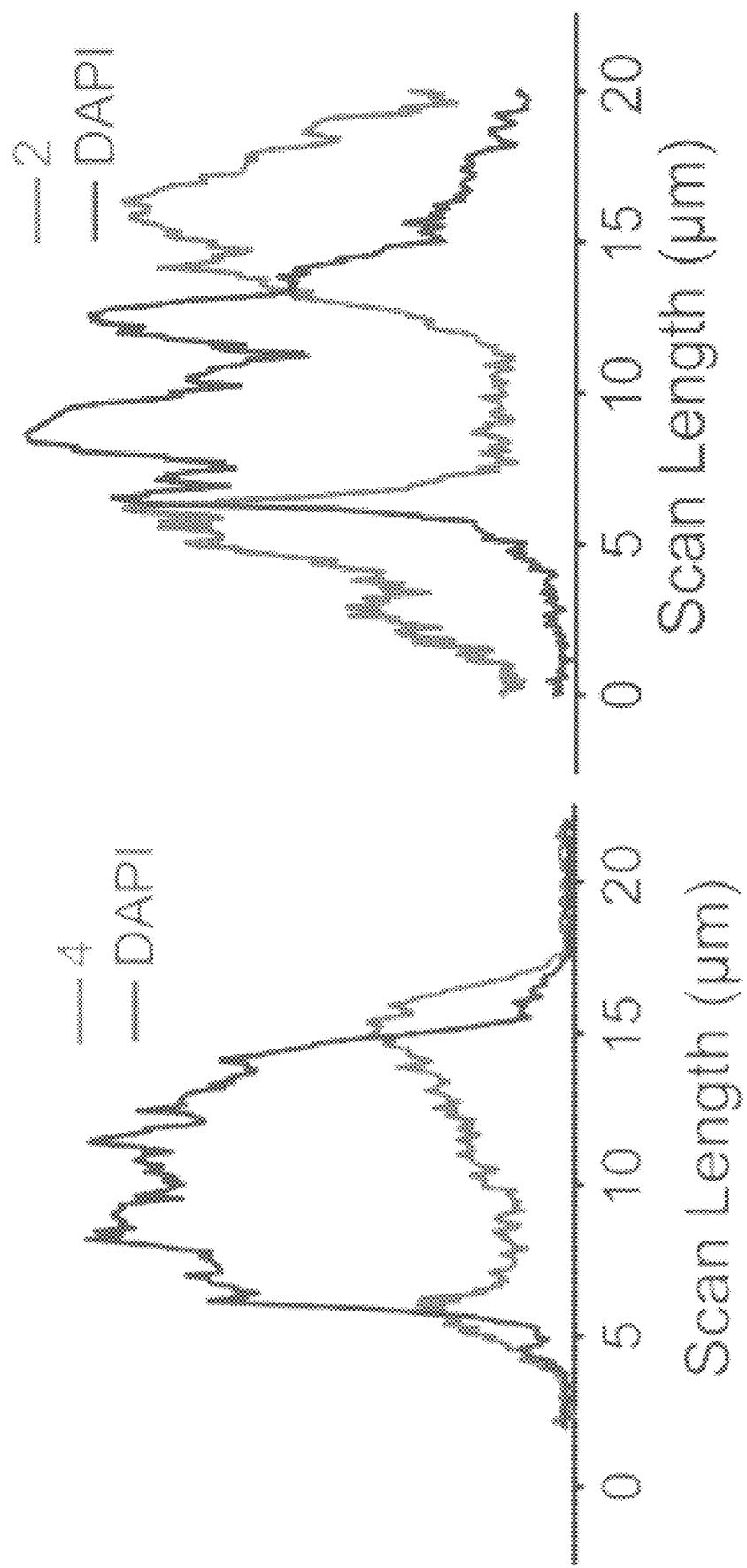
FIG. 21B is a line scan image of the U87 cell incubated with pyridine ligand 4 (left) and metallacycle 2 (right) in Third Embodiment 3 and stained with DAPI.
Figure 22:
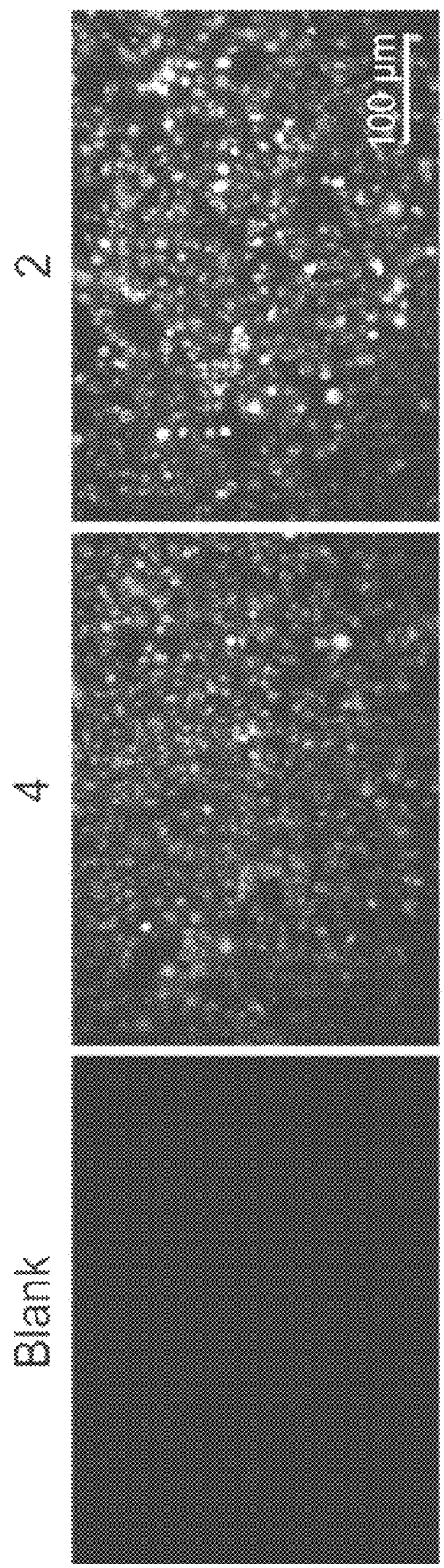
FIG. 22 is a cell singlet oxygen detection graph of the metallacycles 1 and 2 in Third Embodiment (the cell is a U87 cell).

FIG. 21A is a confocal laser scanning microscope image of the U87 cells after co-incubation with the BODIPY monomer 4 and the metallacycle 2, and FIG. 21 (*b*) shows distribution of the cells at white lines (with a scale of 20 m); and FIG. 22 is a CLSM image of the DCHF-DA probe in the U87 cells and shows an average fluorescence intensity of the probe.

We claim:

1. A linear boron-dipyrromethene electron donor, wherein the linear boron-dipyrromethene electron donor has a chemical structural formula of formula 3 or formula 4:

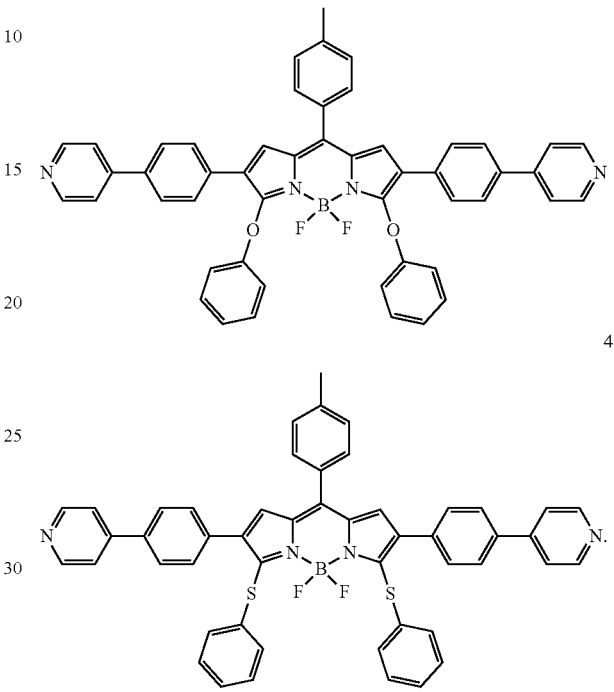

2. The linear boron-dipyrromethene electron donor according to claim 1, wherein, when the linear boron-dipyrromethene electron donor is of formula 3, it is prepared by the following synthetic route:

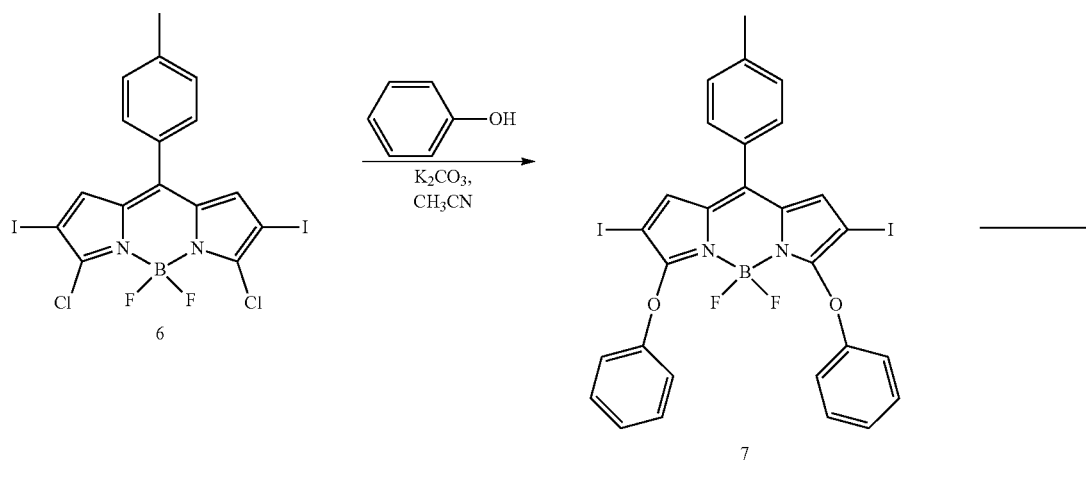

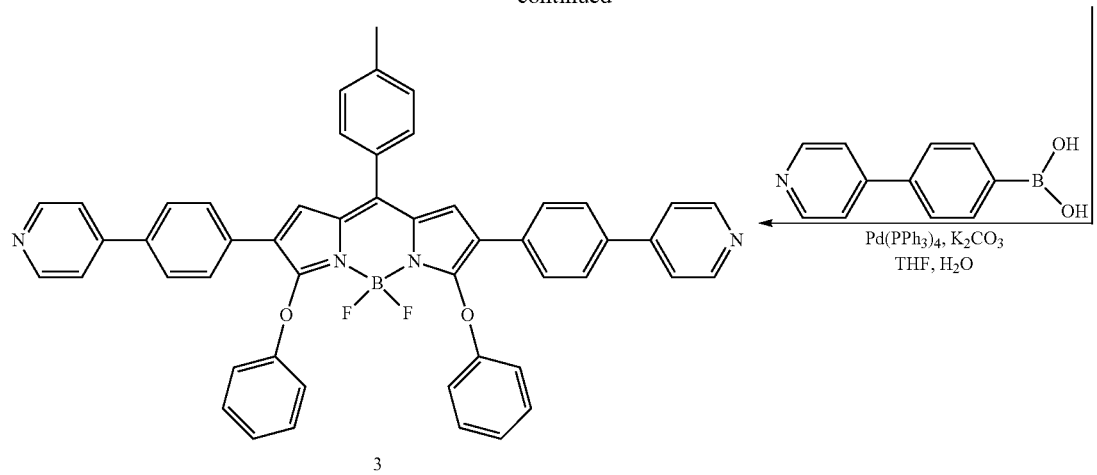

comprising
(1) adding a compound 6, phenol and potassium carbonate into acetonitrile, stirring and refluxing at 50° C. to 85° C. to react for 1 hour to 3 hours, and post-processing to obtain a compound 7; and
(2) adding the compound 7, 4-(4-pyridyl)phenylboronic acid, potassium carbonate and tetrakis(triphenylphosphine)palladium into a mixed solvent of tetrahydrofuran and water to react at 65° C. to 85° C. under the protection of nitrogen for 6 hours to 12 hours, and post-processing to obtain the linear boron-dipyrromethene electron donor of formula 3.

3. The linear boron-dipyrromethene electron donor according to claim 2, wherein a molar ratio of the compound 6 to each of the phenol and the potassium carbonate in the step (1) is 1:2.5 to 3:3; and in the step (2) a molar ratio of the compound 7 to the 4-(4-pyridyl)phenylboronic acid is 1:(2.5 to 4.5), a molar ratio of the compound 7 to the potassium carbonate is 1:(6 to 12), and a molar ratio of the compound 7 to the tetrakis(triphenylphosphine)palladium is 1:(0.05 to 0.1).

4. The linear boron-dipyrromethene electron donor according to claim 1, wherein, when the linear boron-dipyrromethene electron donor is of formula 4, it is prepared by the following synthetic route:

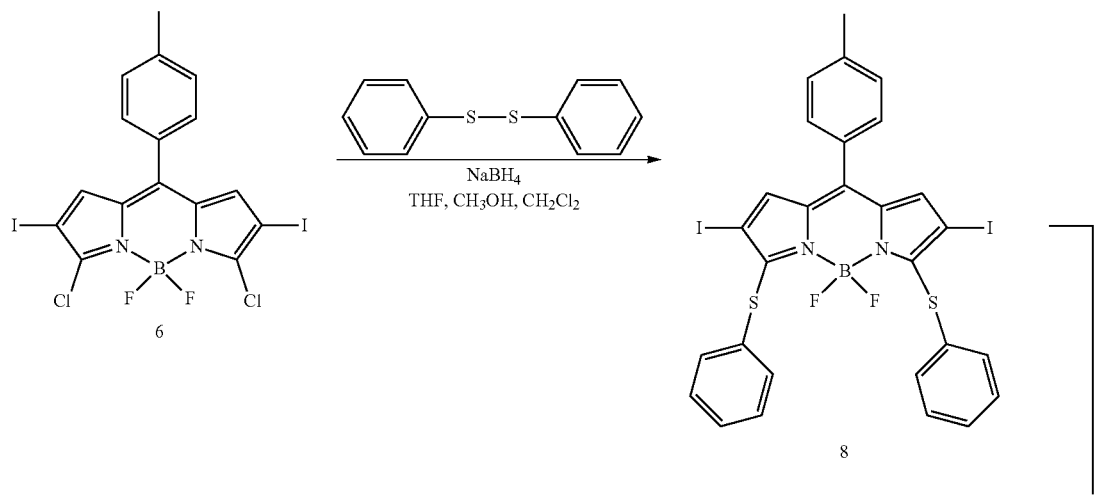

-continued

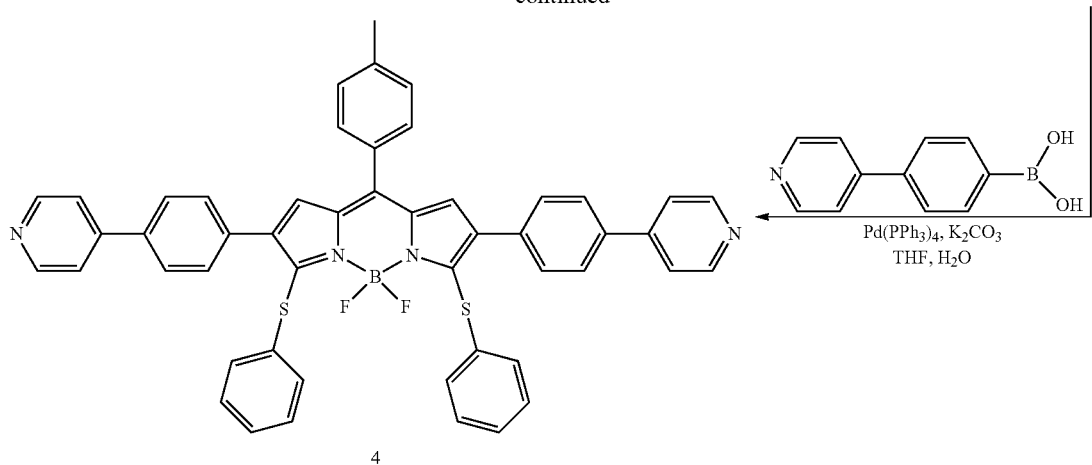

4 comprising (1) adding diphenyl disulfide and sodium borohydride into tetrahydrofuran and heating to 50° C. to 80° C., then adding with methanol, and refluxing for 0.5 hour to 1 hour; and then cooling, adding with a dichloromethane solution of a compound 6, continuously stirring for 5 minutes to 10 minutes, and post-processing after reaction to obtain a compound 8; and (2) adding the compound 8, 4-(4-pyridyl)phenylboronic acid, potassium carbonate and tetrakis(triphenylphosphine)palladium into tetrahydrofuran and water to react at 65° C. to 85° C. under the protection of nitrogen for 6 hours to 12 hours, and post-processing to obtain the linear boron-dipyrromethene electron donor of formula 4.

5. The linear boron-dipyrromethene electron donor according to claim 4, wherein in the step (1) a molar ratio of the compound 6 to the diphenyl disulfide is 1:(2 to 2.5), a molar ratio of the compound 7 to the potassium carbonate is 1:(4 to 5); and in the step (2) a molar ratio of the compound 8 to the 4-(4-pyridyl)phenylboronic acid is 1:(2.5 to 4.5), a molar ratio of the compound 8 to the potassium carbonate is 1:(6 to 12), and a molar ratio of the compound 8 to the tetrakis(triphenylphosphine)palladium is 1:(0.05 to 0.1).

* * * * *